United States Patent
Lutz et al.

(10) Patent No.: US 11,214,502 B2
(45) Date of Patent: Jan. 4, 2022

(54) HUB AND REMOVABLE CARTRIDGE FOR PRODUCING AND DELIVERING OZONATED WATER

(71) Applicant: Enozo Technologies, Inc., North Andover, MA (US)

(72) Inventors: Carl David Lutz, Andover, MA (US); Jeffrey D. Booth, Groton, MA (US); Brian Arena, North Reading, MA (US); Richard A. Federico, Reading, MA (US)

(73) Assignee: Enozo Technologies, Inc., North Andover, MA (US)

( * ) Notice: Subject to any disclaimer, the term of this patent is extended or adjusted under 35 U.S.C. 154(b) by 888 days.

(21) Appl. No.: 15/589,062

(22) Filed: May 8, 2017

(65) Prior Publication Data

US 2017/0275191 A1  Sep. 28, 2017

Related U.S. Application Data

(63) Continuation of application No. 13/607,170, filed on Sep. 7, 2012, now abandoned.

(Continued)

(51) Int. Cl.
*C02F 1/467* (2006.01)
*C25B 1/13* (2006.01)
(Continued)

(52) U.S. Cl.
CPC .............. *C02F 1/4672* (2013.01); *C25B 1/13* (2013.01); *C25B 9/00* (2013.01);
(Continued)

(58) Field of Classification Search
None
See application file for complete search history.

(56) References Cited

U.S. PATENT DOCUMENTS 3,792,610 A   2/1974   Kountanis et al.
3,819,329 A   6/1974   Kaestner et al.
(Continued)

FOREIGN PATENT DOCUMENTS

CN   1594119   3/2005
DE   8224198   11/1982
(Continued)

OTHER PUBLICATIONS

European Office Action for Application No. 12830115.7, dated Jul. 13, 2020 (7 pages).

*Primary Examiner* — Richard C Gurtowski
(74) *Attorney, Agent, or Firm* — Nutter McClennen & Fish LLP

(57) ABSTRACT

An apparatus has a hub including a water inlet for receiving source water, a water outlet for discharging ozonated water, and an interface between the water inlet and the water outlet. The apparatus also has a cartridge including an electrolytic cell for ozonating the source water. The electrolytic cell has a cathode, an anode comprising diamond, and a membrane between the cathode and the anode. The electrolytic cell is configured to flow source water through both the cathode and the anode. The cartridge further includes at least one cartridge port for removably coupling with the interface on the hub. The at least one cartridge port and the interface are configured to flow source water from the hub into the electrolytic cell and to flow ozonated water from the electrolytic cell into the hub.

20 Claims, 14 Drawing Sheets

Related U.S. Application Data

(60) Provisional application No. 61/531,839, filed on Sep. 7, 2011.

(51) Int. Cl.
*C25B 9/00* (2021.01)
*C02F 1/461* (2006.01)

(52) U.S. Cl.
CPC .............. *C02F 2001/46147* (2013.01); *C02F 2201/006* (2013.01); *C02F 2201/46115* (2013.01); *C02F 2209/005* (2013.01); *C02F 2209/006* (2013.01); *C02F 2209/40* (2013.01)

(56) References Cited

U.S. PATENT DOCUMENTS

| | | | |
|---|---|---|---|
| 3,921,002 A | 11/1975 | Williams et al. | |
| 4,048,032 A | 9/1977 | Eibl | |
| 5,223,182 A | 6/1993 | Steiner et al. | |
| 6,024,867 A | 2/2000 | Parise | |
| 7,238,278 B2 | 7/2007 | Coffey et al. | |
| 7,524,466 B2 | 4/2009 | Long | |
| 2002/0134747 A1 | 9/2002 | Babcock et al. | |
| 2002/0168418 A1 | 11/2002 | Lorenz, II et al. | |
| 2003/0019805 A1 | 1/2003 | Fritze | |
| 2003/0168389 A1 | 9/2003 | Astle et al. | |
| 2004/0050781 A1 | 3/2004 | Coffey et al. | |
| 2005/0147546 A1* | 7/2005 | Long ...................... A61L 2/183 422/186.07 |
| 2006/0157391 A1 | 7/2006 | Astle et al. | |
| 2006/0266683 A1 | 11/2006 | Sung | |
| 2008/0067078 A1 | 3/2008 | Kitaori et al. | |
| 2011/0011736 A1 | 1/2011 | Yost, III et al. | |

FOREIGN PATENT DOCUMENTS

| | | |
|---|---|---|
| EP | 1903128 | 3/2008 |
| EP | 2038036 A1 | 3/2009 |
| JP | 2004283662 | 10/2004 |
| JP | 2008246376 | 10/2008 |
| WO | 03070351 | 8/2003 |
| WO | 2004063100 | 7/2004 |
| WO | 2010027989 | 3/2010 |

\* cited by examiner

HUB AND REMOVABLE CARTRIDGE FOR PRODUCING AND DELIVERING OZONATED WATER

RELATED APPLICATION

This application claims priority to U.S. patent application Ser. No. 13/607,170, filed on Sep. 7, 2012; and U.S. provisional patent application No. 61/531,839, filed on Sep. 7, 2011 and titled "Hub and Removable Cartridge for Producing and Delivering Ozonated Water," the both of which are which is hereby incorporated herein by reference.

TECHNICAL FIELD

The present invention relates to electrolytic cells, and more particularly to electrolytic cells that produce ozone.

BACKGROUND ART

Electrolytic cells are in wide use today to produce various chemistries, such as compounds and elements. For example, electrolytic cells commonly produce ozone, an effective killer of pathogens and bacteria and, consequently, an effective disinfectant. The US Food and Drug Administration approved the use of ozone as a sanitizer for food contact surfaces and for direct application to food products. Accordingly, a wide variety of electrolytic cells in use today generate and dissolve ozone directly into source water, thus removing pathogens and bacteria from the water. This reduces the need for dissolving sanitizing chemicals, such as chlorine, directly into unclean water.

SUMMARY OF THE EMBODIMENTS

In a first embodiment of the invention there is provided a replaceable cartridge for ozonating water, the cartridge configured to interface with a hub, the cartridge including a cartridge housing, an electrolytic cell within the housing; a water inlet fluidly coupled to the electrolytic cell; and an ozonated water outlet; a neck having a central axis and at least one thread, the at least one thread having a multi-tiered profile comprising a first ridge having a first radius, and a second ridge having a second radius, the second radius greater than the first radius and configured to rotatingly engage an opposing element on the hub.

In some embodiments, the neck further included at least one radial terminal, the at least one radial terminal extending through the first ridge.

In some embodiments, the cartridge further includes at least one sealing element configured to sealingly engage with the hub, and wherein the sealing element, the at least one thread, and the at least one radial terminal are configured such that the at least one radial terminal engages an opposing terminal on the hub after the sealing element has engaged the hub.

In another embodiment, an apparatus for generating ozone and dissolving ozone into source water includes a hub including a water inlet for receiving source water, a water outlet for discharging ozonated water, and an interface between the water inlet and the water outlet; a cartridge including an electrolytic cell for ozonating the source water, the electrolytic cell having a cathode, and a membrane between the cathode and the anode, the electrolytic cell configured to flow source water through both the cathode and the anode, the cartridge further including at least one cartridge port for removably coupling with the interface on the hub, the at least one cartridge port and the interface configured to flow source water from the hub into the electrolytic cell, and to flow ozonated water from the electrolytic cell into the hub.

In another embodiment, a cartridge for removably coupling with a hub having an interface includes an electrolytic cell for ozonating the source water, the electrolytic cell having a cathode, an anode comprising diamond, and a membrane between the cathode and the anode, the electrolytic cell configured to flow source water through both the cathode and the anode; and at least one cartridge port for removably coupling with the interface on the hub, the at least one cartridge port configured to flow water from the hub into the electrolytic cell, and to flow ozonated water from the electrolytic cell into the hub.

Same embodiments also include a filter positioned to filter the source water before the source water enters the electrolytic cell.

In another embodiment, a cartridge for removably coupling with a hub having an interface includes an electrolytic cell for ozonating the source water, the cell having a cathode, an anode comprising diamond, and a membrane between the cathode and the anode; a filter positioned to filter the source water before the source water enters the electrolytic cell; and at least one cartridge port for removably coupling with the interface on the hub and the at least one cartridge port configured to flow water from the hub into the electrolytic cell and to flow ozonated water from the electrolytic cell into the hub.

In another embodiment, an apparatus for generating ozone and dissolving ozone into source water includes a hub including a water inlet for receiving source water, a water outlet for discharging ozonated water, and an interface between the water inlet and the water outlet; a cartridge including an electrolytic cell for ozonating the source water and at least one cartridge port for removably coupling with the interface on the hub, the cell having a cathode, an anode comprising a diamond, and a membrane between the cathode and the anode; the at least one cartridge port and the interface configured to flow water from the hub into the electrolytic cell, and to flow ozonated water from the electrolytic cell into the hub; and a power control system that controls power to the electrolytic cell as a function of the flow of water through the apparatus.

In some embodiments, the power control system includes a flow monitoring element configured to monitor flow of source water through the apparatus, and at least one electronic component configured to control power to the electrolytic cell based on the flow of source water through the apparatus detected by the flow monitoring element.

In some embodiments, the power control system is configured to switch off power to the electrolytic cell when flow of source water through the apparatus is equal to or less than a predefined threshold.

In some embodiments, the flow monitoring element includes a flow switch, while in some embodiments, the flow monitoring element includes a flow meter.

In some embodiments, the power control system is configured so that power supplied to the electrolytic cell varies directly with the flow of source water through the apparatus.

In another embodiment, an apparatus for generating ozone and dissolving ozone into source water includes a hub including a water inlet for receiving source water, a water outlet for discharging ozonated water, and an interface between the water inlet and the water outlet; a cartridge including an electrolytic cell for ozonating the source water and at least one cartridge port for removably coupling with the interface on the hub, the cell having a cathode, an anode comprising a diamond, and a membrane between the cathode and the anode; the at least one cartridge port and the interface configured to flow water from the hub into the electrolytic cell and to flow ozonated water from the electrolytic cell into the hub; at least one of the hub and the cartridge including indicia for alerting a user; and at least one electronic component in communication with the indicia, the at least one electronic component configured to determine when the cartridge needs replacement and further configured to activate the indicia when the cartridge needs replacement.

In some embodiments, the indicia is a visual indicia, while in some embodiments indicia is an auditory indicia.

In some embodiments, the at least one electronic component is configured to determine that the cartridge needs replacement when the impedance across the electrolytic cell meets or exceeds a predefined threshold.

In some embodiments, at least one of the hub and the cartridge includes a flow meter configured to monitor the flow of source water through the cartridge, the flow meter being in communication with the at least one electronic component, the at least one electronic component being configured to determine that the cartridge needs replacement when the total flow of source water through the cartridge meets or exceeds a predefined threshold.

In another embodiment, a cartridge for removably coupling with a hub having an interface includes an electrolytic cell for ozonating the source water, the cell having a cathode, an anode, and a membrane between the cathode and the anode; at least one cartridge port for removably coupling with the interface on the hub; the at least one cartridge port and the interface configured to flow water from the hub into the electrolytic cell and to flow ozonated water from the electrolytic cell into the hub; indicia for alerting a user; and at least one electronic component in communication with the indicia, the at least one electronic component configured to determine when the cartridge needs replacement and further configured to activate the indicia when the cartridge needs replacement.

In another embodiment, a hub for removably coupling with a plurality of different types of cartridges, the hub being configured to generate ozone and dissolve ozone into source water when coupled with a cartridge of one of the plurality of different types. The hub includes a water inlet for receiving the source water; a water outlet for discharging ozonated water; an interface between the water inlet and the water outlet, the interface removably coupling with at least one cartridge port on a cartridge, the interface configured to flow water from the hub into the cartridge, and to flow ozonated water from the cartridge into the hub; and logic for determining whether a cartridge is coupled with the interface, the logic also being configured to determine the type of cartridge coupled with the interface when a cartridge is coupled with the interface.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments of the invention, an apparatus includes a hub and a removably coupleable cartridge that has an internal electrolytic cell for generating ozone. When coupled to each other, the hub and the cartridge interact to dissolve ozone into source water. The ozonated water can then be used for a wide variety of applications, such as water for drinking, ice-making, and disinfecting surfaces. The ozonated water can also be used in hot tubs, pools, spas, sinks, drums, and various other water containing chambers.

Figure 1:
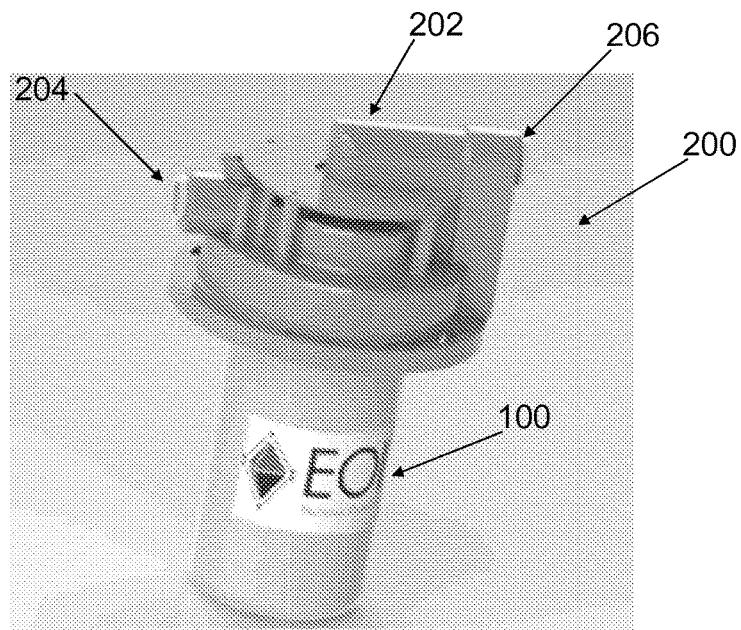
FIG. 1 schematically illustrates an apparatus wherein a cartridge is coupled to a hub in accordance with one embodiment of the present invention.
Figure 2:
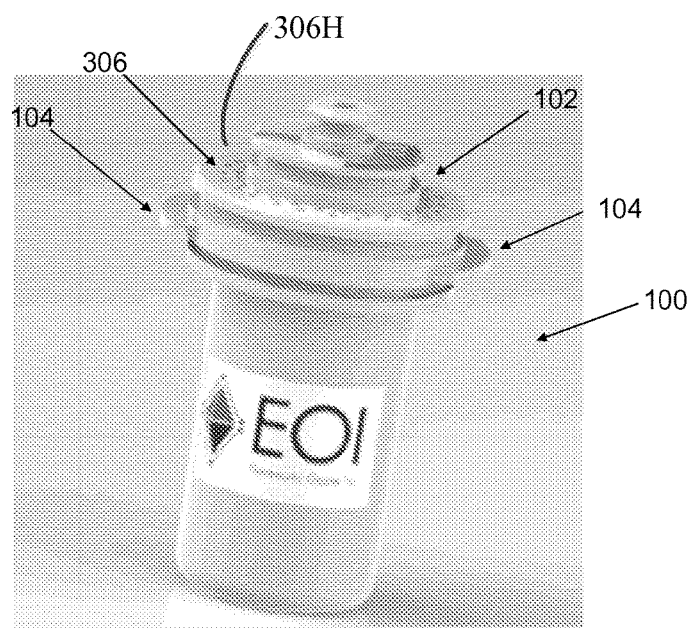
FIG. 2 schematically illustrates the cartridge in accordance with one embodiment of the present invention.

To those ends, FIG. 1 schematically illustrates the apparatus 200 with a cartridge 100 coupled to a hub 202 in accordance with one embodiment of the present invention. FIG. 2 schematically illustrates the cartridge 100 uncoupled from the hub in accordance with one embodiment of the present invention. The cartridge 100 includes an internal electrolytic cell for generating ozone and dissolving ozone into source water. The cartridge 100 also includes a cartridge port 102 for removably coupling with an interface on a hub 202. The hub 202 includes a water inlet 204 for receiving source water and a water outlet 206 for discharging ozonated water. In various embodiments, the hub 202 is directly installed into a water piping assembly (piping assembly not shown). As the source water flows through the piping assembly, the water enters the water inlet 204 of the hub 202. The source water is ozonated within the apparatus 200 and then flows out through the water outlet 206 of the hub 202 and into the piping assembly. In this manner, the apparatus 200 can be installed within water piping assemblies for a number of different applications. For example, the apparatus 200 is installed within the piping assembly of a refrigerator so that ozonated water can be used for drinking and ice-making. In another example, the apparatus 200 is installed within the piping assembly of a hot tub so that water can be purified before it enters the hot tub. In yet another example, the apparatus 200 is installed within faucet plumbing of a sink so that the faucet delivers purified water.

Figure 3:
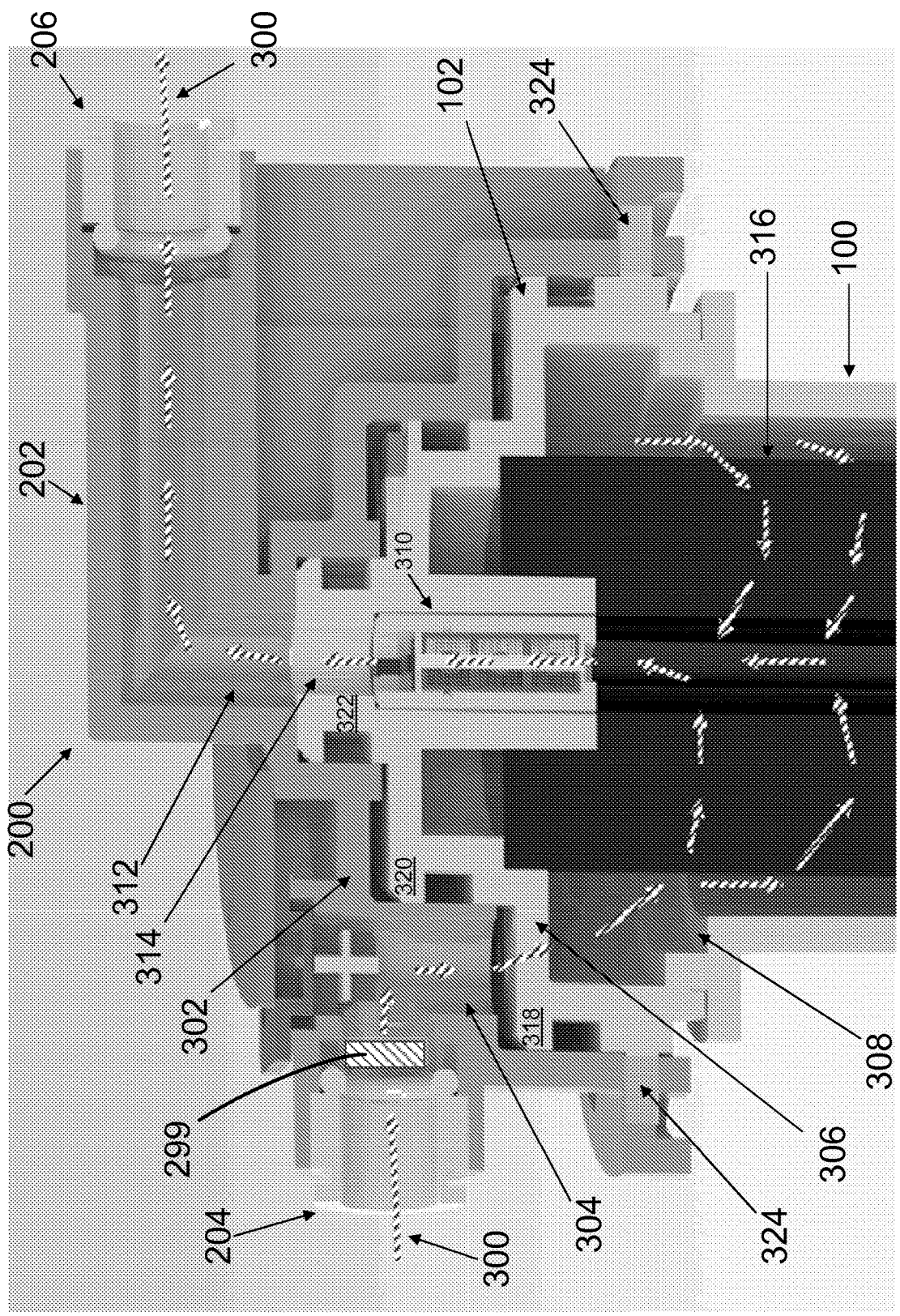
FIG. 3 schematically illustrates a cross-sectional view of the apparatus in accordance with one embodiment of the present invention.

As explained above, the source water is ozonated as it flows through the apparatus 200. FIG. 3 shows a cross-sectional view of the apparatus 200 in accordance with one embodiment of the present invention. FIG. 3 also includes arrows 300 that indicate the flow of source water through the apparatus 200. As shown in FIG. 3, source water flows into the water inlet 204 from the piping assembly (piping assembly not shown). Once the source water is received at the water inlet 204, the water then flows through the hub 202 and into cartridge 100. To this end, the interface 302 on the hub 202 includes an interface outlet 304 for discharging water from the hub 202, and the cartridge port 102 includes a cartridge inlet 306 for introducing water into the cartridge 100. In the embodiment shown in FIG. 3, the cartridge inlet 306 comprises a plurality of holes 30611 that the source water can flow through (also shown in FIG. 2).

Once the source water flows into the cartridge inlet 306, the water is introduced into a tank 308 within the cartridge 100. The tank 308 is configured to store and supply source water to the electrolytic cell 310 within the cartridge 100. The tank 308 may be of various sizes (e.g., 0.025 liters, 0.5 liters, and 25 liters). In various other embodiments, the cartridge 100 does not include the tank 308. In some embodiments, the water pressure from a pressurized piping assembly forces the source water into the electrolytic cell 310. In other embodiments, however, the cartridge 100 and/or the hub 202 include an electronic pump for pumping the source water through the electrolytic cell 310 (pump not shown).

As the source water flows through the electrolytic cell 310, the electrolytic cell generates ozone and dissolves the ozone into the source water. The ozonated water then flows from the cartridge 100 and into the hub 202. To facilitate this flow, the interface 302 of the hub includes an interface inlet 312 for receiving ozonated water from the cartridge 100, and the cartridge port 102 includes a corresponding cartridge outlet 314 for discharging water from the cartridge 100. After the ozonated water flows into the interface inlet 312 of the hub 202, the water exits the hub 202 through the water outlet 206 and typically flows into a pipe that supplies the ozonated water to a particular application (e.g., ice-maker, refrigerator, and/or sink).

As noted above, the cartridge 100 includes an electrolytic cell 310 for ozonating source water that is to be delivered through the water outlet 206 of the hub 202. Any number of different cell designs can suffice for this application. To those ends, the electrolytic cell 310 may have two electrodes: an anode and a cathode. Among other things, the anode may be formed from a boron doped diamond material, while the cathode may be formed from titanium or another conductive material. Among other configurations, the anode and/or the cathode may have planar configurations. In some embodiments, the anode comprises a coated diamond material (e.g., a substrate that is coated with a diamond material), while, in other embodiments, the anode comprises a free standing diamond material. In various embodiments of the present invention, the free standing diamond material has a thickness of between 0.2 mm to 1.0 mm.

To form ozone, energizing circuitry applies a positive electric potential to the anode and a negative electric potential to the cathode. As known by those in the art, the difference in electric potential between these two electrodes breaks up water molecules into hydrogen cations and oxygen. The oxygen forms into ozone, which dissolves into the source water. The negative potential applied to the cathode, however, draws the hydrogen cations from the anode side of the cell to the cathode side. Once on the cathode side of the cell, the cations may form hydrogen bubbles.

To facilitate proton movement (e.g., hydrogen cations) between the electrodes (e.g., anode and cathode), some embodiments position, between the electrodes, a solid membrane that functions as a solid electrolyte. For example, the solid membrane may include a proton exchange membrane (known also as a "PEM"), such as Nafion®. Additionally, in some cases, the membrane acts as a barrier to separate the source water flow on the cathode side of the cell from source water on the anode side of the cell.

Thus, in illustrative embodiments of the present invention, the electrolytic cell 310 is configured so that the source water flow is split between the anode side of the cell and the cathode side of the cell. The source water that contacts the anode is ozonated, while the source water that contacts the cathode receives the hydrogen byproduct. In such an embodiment, the electrolytic cell 310 does not include a separate catholyte solution or catholyte reservoir, instead, the molecules of the source water are disassociated to form ozone. After passing through the electrolytic cell 310, the ozonated water on the anode side of the cell mixes with the water on the cathode side of the cell. The mix of ozonated water and the hydrogen byproduct water then flows through the cartridge outlet 314, into the hub 202, and exits the hub through the water outlet 206.

Illustrative embodiments of the apparatus include a number of features that protect the electrolytic cell 310 itself, thus extending its useful lifespan. For example, over time, impurities within the source water undesirably can build up within the electrolytic cell 310 and, consequently, decrease cell efficiency. Accordingly, in some embodiments, the cartridge 100 includes an internal filter 316 that removes scale and other impurities from the source water. The filter 316 preferably is positioned to filter source water before it enters the electrolytic cell 310. For example, in FIG. 3, the filter 316 is located within the tank 308, consequently filtering the source water before it flows to the electrolytic cell 310. Alternatively, the filter 316 can be located within the hub 202 between the water inlet 204 and the interface outlet 304.

In additional or alternative embodiments, to prevent buildup of scale on the electrolytic cell 310, the apparatus 200 is configured to cycle polarity across the cell. In one such embodiment, both electrodes of the electrolytic cell include a diamond material (e.g., one or both electrodes include a free standing diamond material or a coated diamond material). The electrolytic cell 310 cycles between a positive potential on a first electrode, and then a positive potential on a second electrode. When a positive potential is applied to the first diamond electrode, it acts as the anode and the second diamond electrode acts as the cathode. When the polarity is reversed and the positive potential is applied to the second diamond electrode, then the first diamond electrode acts as the cathode and the second diamond electrode acts as the anode. In this manner, the cell 310 continuously produces ozone while cycling through the differing polarities. The changing polarity acts to dislodge scale and other impurities from the membrane and other cell components.

In yet another illustrative embodiment, the apparatus includes a check valve 299 for preventing damage to the membrane of the electrolytic cell 310. The inventors discovered that when water is not flowing through the apparatus 200, it is possible for the water within an already primed or used cartridge 100 to drain from the cell 310. In embodiments where there is a membrane, this undesirably dries out the membrane within the cell 310, which can lead to membrane damage and, ultimately, premature product failure. More specifically, cations may become trapped within the membrane if the cell has been operated with impure water. These cations often remain trapped even when the membrane dries, hampering rewetting of the membrane and degrading performance. To mitigate that problem, the apparatus 200 may include a check valve 299. A check valve 299 may be placed in a variety of points in the water flow path, such as in or at the fluid flow at inlet 204, for example. More specifically, at least one of the cartridge 100 and the hub 202 has a check valve 299 for minimizing the likelihood that water will drain from the electrolytic cell 310 and back into the tank 308 when the cell is not in operation. The check valve 299 can be located at any point in the water flow path between the water inlet 204 and the water outlet 206 of the hub (e.g., within the cartridge 100 between the cell 310 and the tank 308) to retain water within the cell when the water is not flowing through the apparatus 200.

Even with the above-described measures for protecting the electrolytic cell 310, after continuous use, the cartridge 100 may become exhausted. For example, scale may build up on the electrolytic cell 310 and significantly decrease the operating efficiency of the cell. In another example, scale and other impurities may build up within the filter 308 and obstruct the flow of water to the electrolytic cell 310. When the cartridge 100 is so exhausted, illustrative embodiments of the present invention advantageously allow the cartridge to be replaced with a new cartridge. Exemplary embodiments of the cartridge 100 are removably coupleable with the hub 202 and, therefore, are easily removable and exchangeable with another cartridge. To that end, in illustrative embodiments of the invention, the interface 302 and the cartridge port 102 deliver a removably coupleable connection for quick and easy exchange of the cartridge.

The term "removably coupleable" should be considered in the context of the ozone generation art. For example, for purposes of this description and any attached claims, one skilled in the art would not consider a cartridge 100 to be "removably coupled" to the hub 202 if it normally must be cut, forcibly broken from the housing, or if it required specialized training-beyond the minimal, "lay-person" training required for the cartridges described herein. Thus, a cartridge 100 that requires significantly less time and complexity to replace, when compared to prior art ozone cartridges known by the inventors, should be considered "removably coupleable."

In the embodiment shown in FIGS. 1, 2, and 3, the cartridge 100 and the hub 202 are removably coupleable via a "bayonet mount." To that end, the cartridge port 102 includes two tabs 104 (shown in FIG. 2) that interlock with slots 324 (shown in FIG. 3) within the interface 302 to secure the cartridge 100 to the hub 202. Typically, with a bayonet mount, the user pushes the cartridge 100 into the interface 302 and twists the cartridge to lock the cartridge into place on the hub 202. The cartridge port 102 and/or the interface 302 may also include one or more sealing members (e.g., O-rings) for creating a water-tight seal between the cartridge 100 and the hub 202. In FIG. 3, a first O-ring 318 and a second O-ring 320 create a watertight seal between the interface outlet 304 and the cartridge inlet 306, while a third O-ring 322 creates a water-tight seal between the cartridge outlet 314 and the interface inlet 312.

Various other removably coupleable connections are also within the scope of the present invention. For example, in another exemplary embodiment, the cartridge port 102 and the interface 302 use a threaded connection. In such an embodiment, the cartridge port 102 and the interface 302 may have round configurations. The interface 302 includes a flange around its perimeter and the inner diameter of the flange includes female threads, while the outer diameter of the cartridge port 102 includes male threads. Using such an arrangement, a user can "screw" the cartridge 100 onto the interface 302 of the hub.

In various other exemplary embodiments, the removably coupleable connection uses guides or guide fingers to properly align and/or support the cartridge 100 when installed to the hub 202. Once properly aligned, a locking mechanism firmly secures and removably couples the cartridge 100 to the hub 202. For example, in some cases, the locking mechanism uses an interference fit (e.g., press fit) between the cartridge port 102 and the interface 302 of the hub. In other examples, the locking mechanism includes latches, adhesives, screws, snap fittings, bolted assemblies and/or push-to-lock connectors, each of which can be used to firmly secure and removably couple the cartridge 100 to the hub 202.

Examples of further removably coupleable connections and O-ring configurations are disclosed in U.S. patent application Ser. No. 12/769,133, filed on Apr. 28, 2010 (published as U.S. Publication No. 2011/0011736), which is hereby incorporated by reference in its entirety.

Illustrative embodiments also include features for intelligently monitoring the flow of source water through the apparatus and modulating the generation of ozone based upon the flow of source water. In one embodiment, the apparatus 200 includes a power control system that controls power to the electrolytic cell 310 as a function of the flow of water through the apparatus.

Figure 4A:
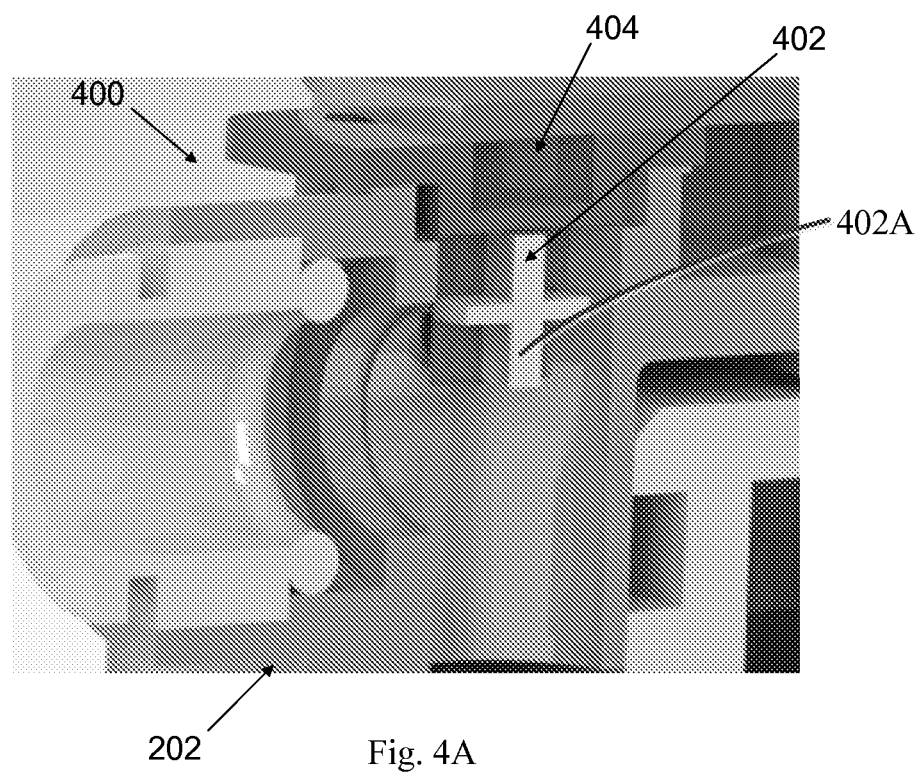
FIG. 4A schematically illustrates an embodiment of a flow monitoring element in accordance with one embodiment of the present invention.

To this end, the power control system includes a flow monitoring element configured to monitor flow of source water through the cartridge. FIG. 4A schematically illustrates a flow monitoring element 400 in accordance with one embodiment of the present invention. In the embodiment shown in FIG. 4A, the flow monitoring element 400 is located within the hub 202. In other embodiments, however, the flow monitoring element 400 can also be located within the cartridge 100. In FIG. 4A, the flow monitoring element 400 includes a paddle wheel 402 with a plurality of scoops 402A. The paddle wheel 402 is located within the flow path of the source water. As the water flows past the paddle wheel 402, the water pushes the scoops 402A of the paddle wheel and the paddle wheel 402 turns. In the specific embodiment shown on FIG. 4A, the movement of the paddle wheel is detected by a hall sensor 404 is located above the paddle wheel 402. One or more of the scoops 402A of the paddle wheel 402 include a magnet and the hall effect sensor 404 uses or senses the magnet to detect movement of the paddle wheel.

The power control system (e.g., part of system 1100) further includes at least one electronic component (1101) for controlling power supplied to the electrolytic cell 310 based upon the flow of source water. In one exemplary embodiment, the electronic component comprises a PCB board with a microprocessor (e.g., a "PIC" processor; see, for example, processor 1101 in FIG. 11) that is in electronic communication with the flow monitoring element 400. The electronic component receives a signal representative of the flow of source water from the flow monitoring element 400. As suggested above, the electronic component is further configured to modulate the power supplied to the electrolytic cell 310 based on the flow of source water through the apparatus 200, as detected by the flow monitoring element 400.

The power control system can modulate the power provided to the cell 310 in a variety of different ways. In one embodiment of the present invention, the power control system has two modes of functioning—an activated mode and a deactivated mode. In such an embodiment, the flow monitoring element 400 might be configured as a simple flow switch. When the flow switch is activated (i.e., source water is flowing through the apparatus 200), the electronic component is configured to provide power to the electrolytic cell 310. When the switch is deactivated (i.e., source water is not flowing through the apparatus 200), the electronic component is configured to shut off power to the cartridge 100.

In other embodiments, however, the power control system 1100 more intelligently monitors the flow of source water and modulates the generation of ozone based upon the flow of source water. In such an embodiment, the flow monitoring element 400 might be configured as a flow meter that can detect the amount (e.g., rate and/or volume) of water flowing through the apparatus 200. As the amount of source water flowing through the apparatus 200 changes, the electronic component modulates the power supplied to the electrolytic cell 310, which in turn modulates the amount of ozone generated. For example, as the flow of source water increases, greater power is supplied to the electrolytic cell 310 so that more ozone can be generated to account for the greater flow of water. Similarly, as the flow of source water decreases, the power supplied to the electrolytic cell 310 also decreases because a lesser quantity of ozone is necessary to disinfect the water. As the flow of water through the apparatus 200 decreases, at some point, the electronic component may be configured to switch off power to the electrolytic cell 310 when the flow of source water is equal to or less than a predefined threshold.

Illustrative embodiments of the apparatus 200 also include an indicia system 1160 for alerting a user when the cartridge 100 needs to be replaced. Accordingly, the 202 hub and/or the 100 cartridge include indicia for alerting a user. In some embodiments, the indicia can be visual, such as an LED light (1157) or an LCD display (1158). In additional or alternative embodiments, the indicia can be auditory, such as a sound produced by a buzzer 1162 for example. The indicia system of various embodiments also includes at least one electronic component (e.g., a PCB board with a processor) that is in electronic communication with the indicia. The electronic component is located on the hub 202 and/or the cartridge 100. The electronic component is configured to determine when the cartridge 100 needs replacement and to activate the indicia when the cartridge needs replacement.

The indicia system can use a variety of different parameters to determine that the cartridge 200 need to be replaced. In one illustrative embodiment, the electronic component is configured to monitor at least one electrical property of the electrolytic cell 310 and to determine that a cartridge (e.g. 110, 800) needs replacement based upon a measure of the electrical property. For example, the inventors learned that the impedance of the electrolytic cell 310 increases as the cell collects scale and other impurities. Accordingly, in one embodiment, the electronic component (e.g, 1101) monitors the impedance across the electrolytic cell 310. For example, the voltage and current supplied to the cell 310 may be measured as described below, and the ratio of that voltage and current can be calculated (according to Ohm's law, V/I=R) to determine the impedance of the cell 310. When the impedance meets or exceeds a predefined threshold, the electronic component will activate the indicia to alert the user to replace the cartridge 100.

In an additional or alternative embodiment, the electronic component is configured to activate the indicia 1160 based upon a total amount of water that flows through the cartridge (100, 800). In such an embodiment, the electronic component 1101 is in electronic communication with the flow monitoring element 400. The electronic component and the flow monitoring element 400 are configured to monitor the total amount of water that has flowed through the cartridge 100 while the cell 310 has been active. When the total flow of source water through the cartridge 100 meets or exceeds a predefined threshold, the electronic component 1101 activates the indicia to alert the user to replace the cartridge 100.

Figure 4B:
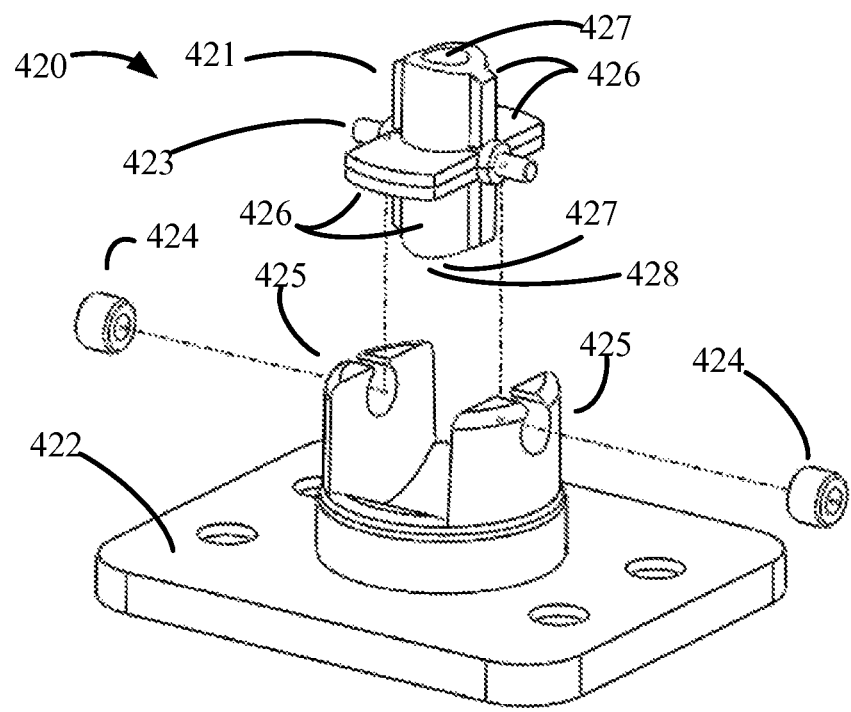
FIG. 4B schematically illustrates another embodiment of a flow monitoring element in accordance with one embodiment of the present invention.

An alternate embodiment of a flow sensor 420 is schematically illustrated in FIG. 4B, and includes as wheel 421 suspended from a base 422. The wheel 421 has an axle 423 supported from the base 422 by two bearings 424. The bearings 424 mitigate friction that might otherwise occur between the axle 423 and arms 425 of base 422. This not only allows the wheel 421 to turn more freely, but also extends the life of the sensor 420 due to reduced wear on the moving wheel.

The wheel 421 includes a number of arms or scoops 426, and at least one of the arms 426 includes a magnet 427. As water flows into the hub 200, it turns the wheel, and with each rotation the magnet 427 passes a sensor, such as a Hall effect sensor 404, in the hub. In some embodiments, the sensor 404 includes two opposing arms 426, each of which has a magnet 427, or at least one of which has a magnet while the other has a weight (428) instead of a magnet. As such, each magnet 427 counterbalances the other, so that the wheel 421 turns more smoothly than it might if no such counterweight or second magnet were present.

Figure 4C:
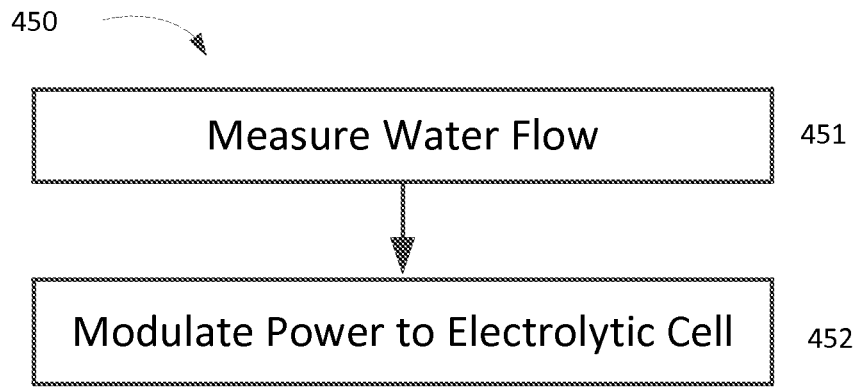
FIGS. 4C and 4D illustrated methods of operating an electrolytic cell or a cartridge based on measured water flow.

The sensor 404 is coupled to a circuit 1101 (see FIG. 11, for example) that determines the quantity of water flowing past the flow sensor 420 and therefore into the hub 202 by, for example, counting the number of times the sensor 404 detects the passage of magnet 427 in a given span of time (for example, passages per second). A method 450 of operating an electrolytic cell 310 is illustrated in FIG. 4C, in which the water flowing to the cell is measured (step 451) and the power to the cell 310 is modulated as a function of the measured water flow (step 452).

Figure 4D:
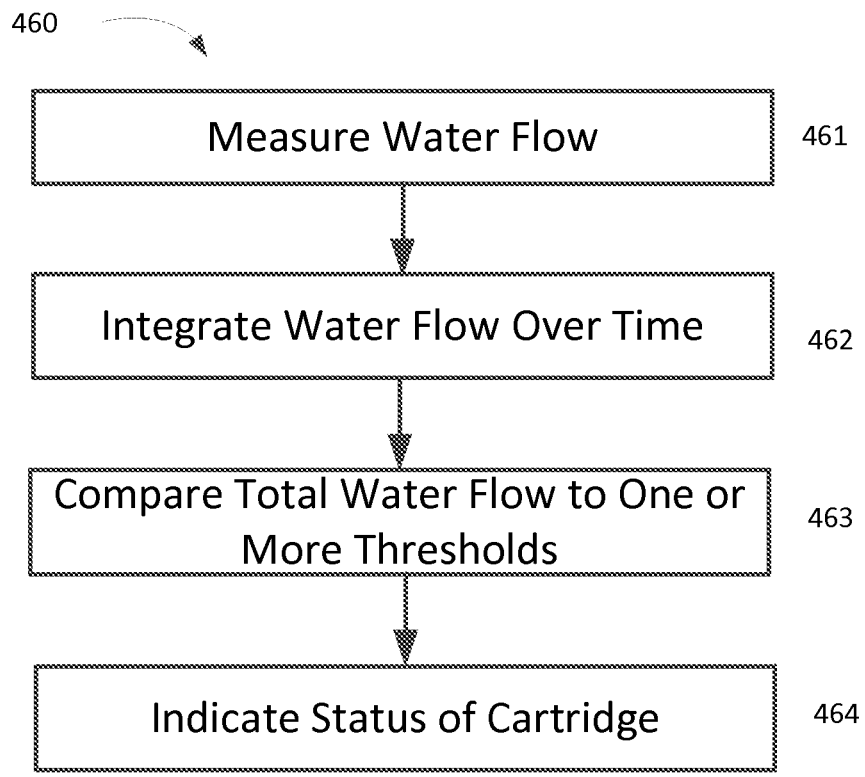

In some embodiments, the power supplied to the electrolytic cell 310 may be modulated based on the measured water flow. In some embodiments, the total quantity of water is determined by summing (or integrating) the output of sensor 404, for example to determine when the cartridge 100 should be replaced after a predetermined amount of water has passed through the cartridge 100. A method 460 of operating an electrolytic cell, or a cartridge containing an electrolytic cell 310, is illustrated in FIG. 4D. The water flow is periodically measured at step 461. The individual measurements are summed or integrated over time (step 462) to indicate the total amount of water that has passed the wheel 421. That total is compared to a predetermined threshold (step 463), and the status of the cell 310 or cartridge is indicated (step 464) by, for example, illuminating a light or issuing an audible signal, for example. The status of the cell or cartridge may, for example, indicate that the cell 310 or cartridge 100 is nearing the end of its life (because the total amount of water processed has reached a warning threshold), or that the cell 310 or cartridge 100 has reached the end of its useful life (because the total amount of water processed has reached a second threshold that is greater than the warning threshold). In some embodiments, the method 450 may compare the total water flow to the second threshold after, or only after, determining that the total water flow has reached or surpassed the warning threshold. In some embodiments, the method 450 may compare (step 463) the total water flow to the second threshold before comparing the total water flow to the warning threshold, and then compare the total water flow to the warning threshold if or only if the total water flow has not yet reached the second threshold (for example, similar to the method described in FIG. 12).

Some embodiments include a water flow regulator 1191, which flow regulator 1191 may be placed in the fluid path of the incoming water. For example, a water regulator 1191 may be in the fluid flow at inlet 204. The water flow regulator 1191 may be operated, for example by processor 1101, to control the amount of water flowing through the cartridge, based on the water flow measured by wheels 402 or 420, for example.

Figure 5:
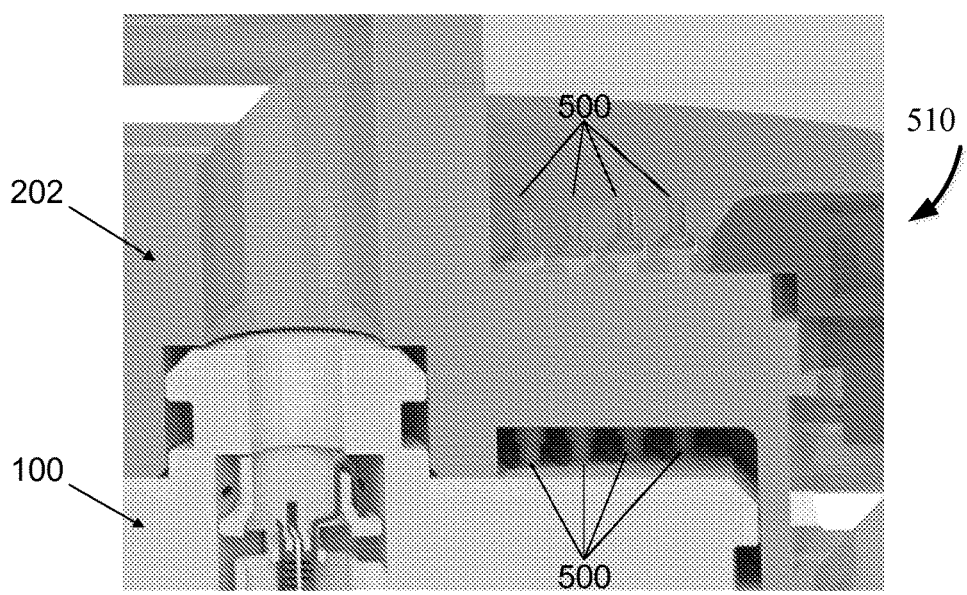
FIGS. 5 and 6 schematically illustrate circuits for determining a type of cartridge that is coupled with the hub.
Figure 6:
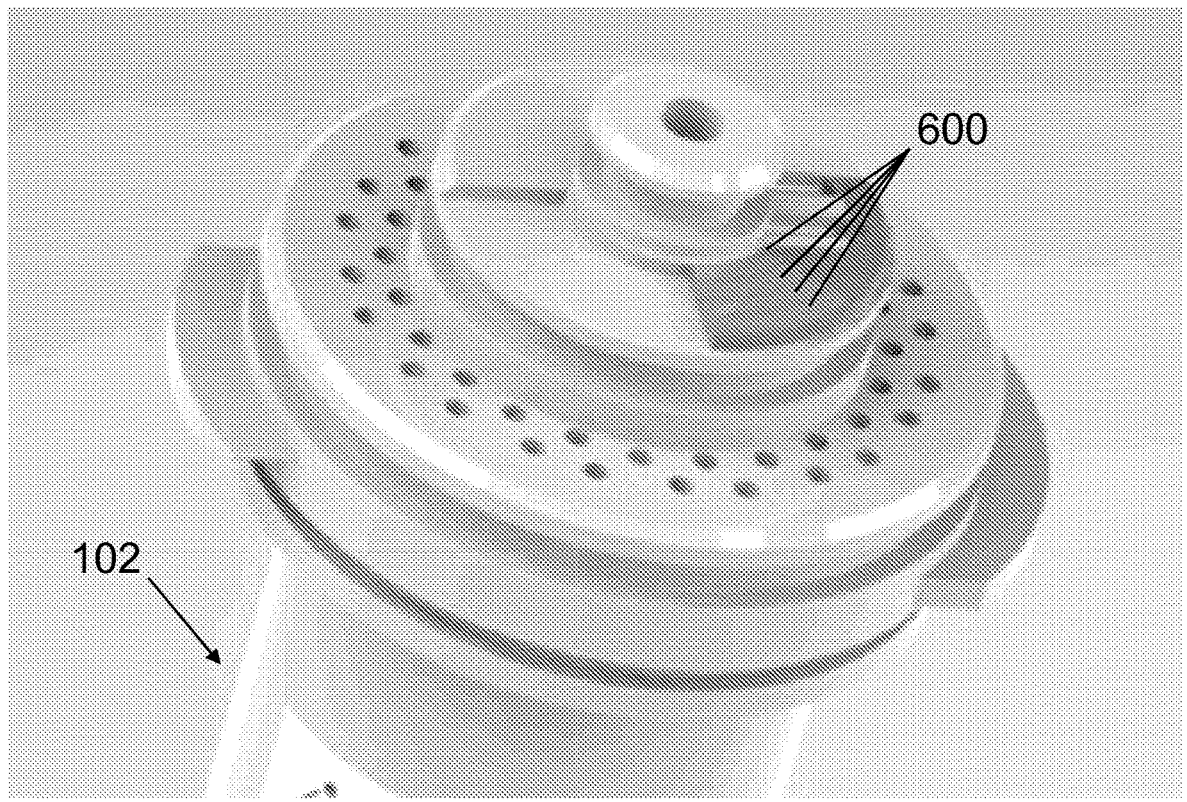

In further illustrative embodiments of the present invention, the hub 202 is configured so that a plurality of different types of cartridges 100 are removably coupleable with the hub. The different types of cartridges 100 may vary from each other in that they have different sized tanks 308 and/or have different types of electrolytic cells 310. In such embodiments, the apparatus 200 may include logic 510 for determining whether a cartridge 100 is coupled with the interface 302, and logic 510 and for determining the type of cartridge 100 coupled with the interface. FIGS. 5 and 6 schematically show logic for determining the type of cartridge 100 that is coupled with the interface 302. In the embodiment of FIG. 5, the hub 202 includes a plurality of pins 500. The pins 500 are arranged so that at least some of the pins engage the cartridge 100 when the cartridge is coupled to the hub 202. FIG. 6 schematically shows contact pads 600 on the cartridge 100 that engage the pins 500 when the cartridge is coupled to the hub 202.

The logic further includes at least one electronic component (e.g. 1101), such as a PCB board with a microprocessor (e.g., processor 1101), that identifies the type of cartridge 100 that is coupled to the hub 202 based upon which of the plurality of pins 500 is engaged. Each of the different types of cartridges 100 may be represented by a different engagement pattern. For example, the electronic component may determine that a cartridge 100 is of a particular type because all four pins 500 are engaged when the cartridge 100 is attached to the hub 202. In a corresponding manner, in another example, the electronic component (1101) may determine that the cartridge 100 is a different particular type because only the middle two pins 500 are engaged.

The pins 500 can engage the cartridge 100 in a number of different ways. For example, in one embodiment, the contact pads 600 include a conductive material and the pins 500 include open circuits that can be closed by contacting the contact pads 600. The electronic component can thus identify which of the pins 500 is engaged by passing a current to the pins and determining which circuits are closed. In another embodiment, the pins 500 are configured to be mechanically depressible and at least some of the pins 500 are configured to be depressed when the cartridge 100 is coupled to the hub 202. In such an embodiment, the electronic component monitors the pins 500 and identifies the type of cartridge that is coupled to the hub 202 based upon which of the plurality of pins is depressed.

In yet another embodiment, instead of using pins 500, the logic is configured to identify the type of cartridge 100 based upon a magnetic pattern. For example, the hub 202 may include one or more hall sensors 404 that are configured to engage with one or more magnets on the cartridge 100. In such an embodiment, the electronic component 1101 is in electronic communication with the hall sensors 404 and identifies the cartridge 100 based upon the hall sensors that are activated when the cartridge is coupled to the hub 202. Each of the different types of cartridges 100 may be represented by a different pattern of magnets. In this manner, the electronic component identifies the type of cartridge 100 based upon which hall sensors are activated.

In further embodiments of the present invention, the apparatus 100 is configured to modulate the electrical power supplied to the cartridge 100 based upon the type of cartridge that is coupled to the hub 202. To this end, the electronic component 1101 may be further configured to modulate at least one electrical property of the power (e.g., voltage, current, and/or power itself) supplied to the cartridge 100 from the hub 202 based on the type of cartridge (e.g. 100, 800) that is coupled to the hub 200. For example, if a particular type of cartridge 100 includes an electrolytic cell 310 that requires 20 volts, once the electronic component identifies the cartridge, the component 1101 will modulate the power from a voltage source (e.g., 1131V) to the cartridge 100 so that it meets the required 20 volts. In another example, a second type of cartridge 100 may require only 10 volts to operate the electrolytic cell 310. When that second type of cartridge 100 is coupled to the hub 202, the electronic component 1101 identifies it as the second type and modulates the power to the cartridge so that it meets the 10 volt requirement. In some embodiments, the cell 310 is powered by a fixed current from a current source 1131, and the current may modulated to control the amount of ozone produced. For example, the current may be modulated as a function of the quantity of water flowing through the cartridge 100.

In the embodiments described above, the logic 510 is used to identify the type of cartridge 100 coupled to the hub 202. In additional or alternative embodiments, similar logic 510 may be used on the cartridge 100 to identify various different hubs 202 that are coupleable to the cartridge 100. In further illustrative embodiments, the logic 510 is implemented with respect to both the hub 202 and the cartridge 100 so that the hub 202 and cartridge 100 can each recognize each other and modulate their operation appropriately based on the identification.

As noted above, the apparatus 200 uses electric power to operate the electrolytic cell 310 and various other components of the apparatus 200. A variety of different power sources can energize the apparatus 200. For example, a hard-wired AC converter can receive power from a conventional wall plug. In another embodiment, batteries provide the power for the apparatus. Same embodiments simply use non-rechargeable batteries. Other embodiments, however, use rechargeable batteries that can be charged directly through a hard wire connection, such as a power cord. In other embodiments, inductive components recharge the rechargeable batteries. In some embodiments, the cartridge 100 includes the power source. For example, the cartridge may 100 include batteries or the hard-wired AC converter. In another embodiment, however, the power source is located on the hub 202 and power is transmitted to the cartridge 100. Power can be transmitted to the cartridge 100 using various different implementations. In the embodiment of FIGS. 5 and 6, the power can be transmitted through the pin 500 and 600 contact pad arrangement. In such an embodiment, some of the pins 500 may be dedicated to transferring power to cartridge 100, while other pins 500 are used as part of the logic that identifies the cartridge. In another embodiment, however, power is transmitted to the cartridge 100 from the hub 202 using a simple plug and socket connector. Various other implementations known in the art may also be used.

There may be certain implementations when the batteries or other power sources do not deliver the precise or correct voltage or current to the internal electronic components (e.g., electrolytic cell 310). Accordingly, illustrative embodiments also include on-board electronics (1131V) for converting the voltage provided by the power source to an appropriate form and level. For example, the apparatus may include a PCB board with a conventional voltage or current boosting circuit 1131V that boosts the voltage supplied by the power source to 10-20 volts for powering the electrolytic cell 310. Electrolytic cells 310 that produce ozone typically function more efficiently at greater electrical potentials (e.g., 10-20 volts). In additional or alternative embodiments, the apparatus 200 also include a transformer for reducing voltages supplied to the components of the electrolytic cell from, among other things, a conventional wall plug.

Figure 7A:
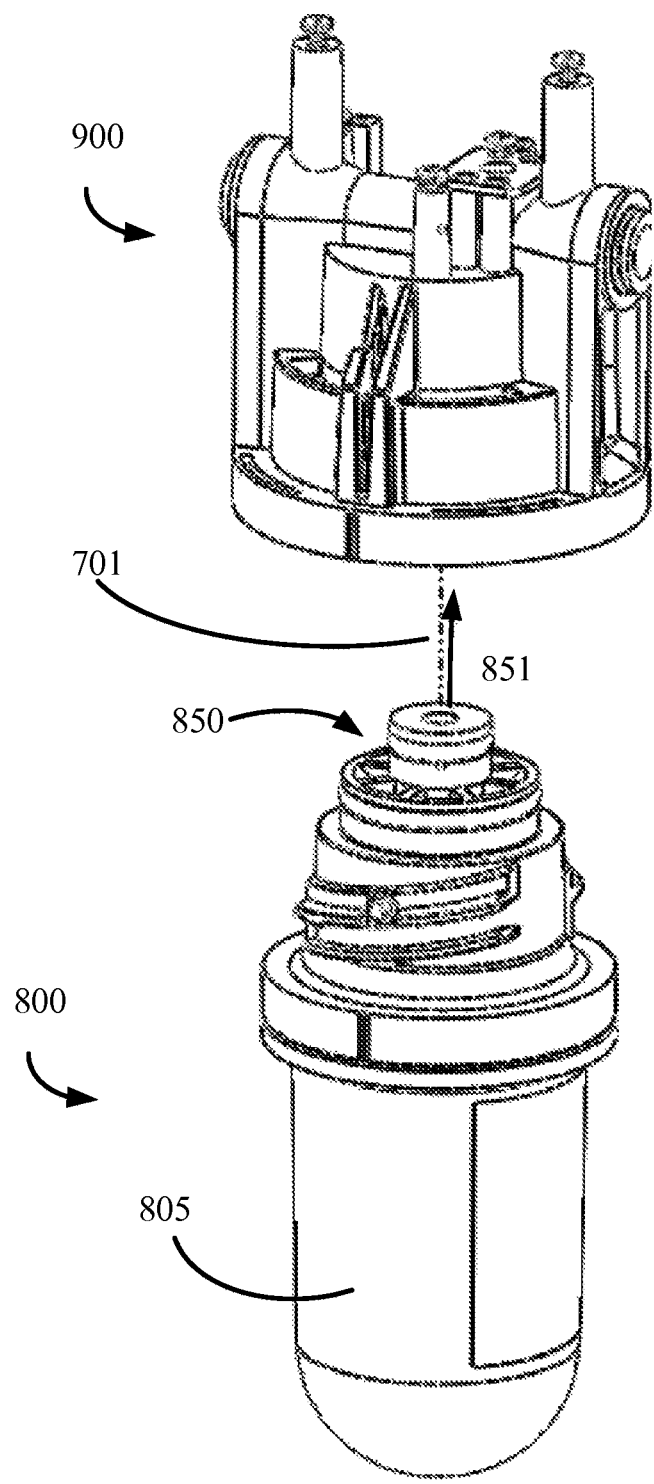
FIGS. 7A and 7B schematically illustrate an alternate embodiment of a hub and replaceable cartridge.
Figure 7B:
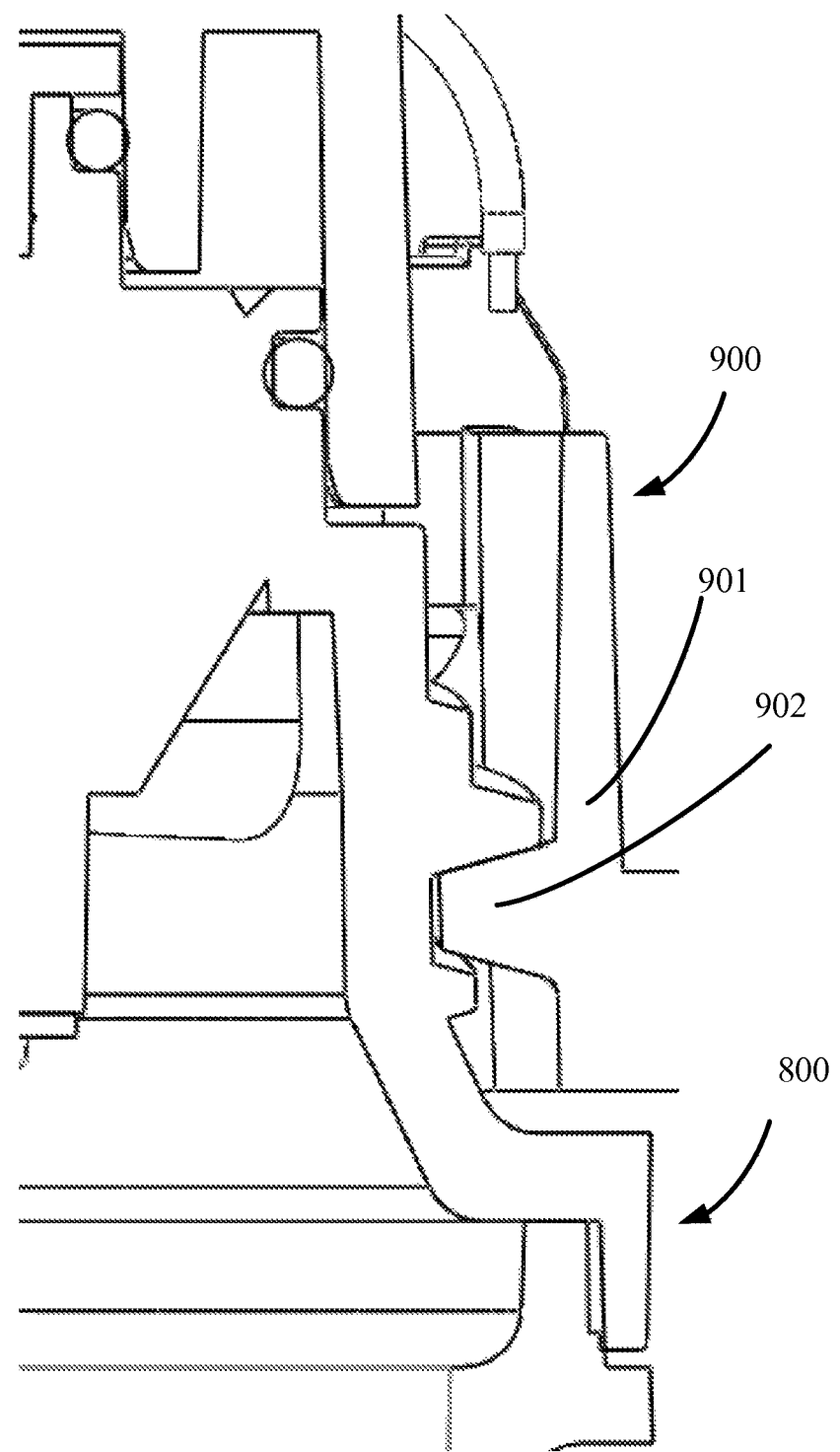

Alternate embodiments of a hub 900 and cartridge 800 are schematically illustrated in FIGS. 7A and 7B. Additional details of hub 900 and cartridge 800, and their interaction, are schematically illustrated in FIGS. 8A, 8B, 8C, and 9.

The cartridge 800 and hub 900 are configured such that the cartridge 800 is easily removable from the hub 900 so that one cartridge 800 can be replaced by another. To that end, cartridge 800 has a threaded neck 802. Threads 820 engage counterpart threads or flanges 902 within the bell 901 of the hub 900 such that as the cartridge 800 is turned relative to the hub 900, the cartridge 800 is drawn (screwed) into the hub 900.

In some embodiments, the end or face 801 of the cartridge 800 that engages the hub 900 includes a cartridge input port 810 and a cartridge output port 811. The input port 810 provides a passage for water to enter the cartridge 800 from the hub, where it encounters electrolytic cell 310 that ozonates the water. The ozonated water then passes through the output port 811 into the hub 900.

Figure 8A:
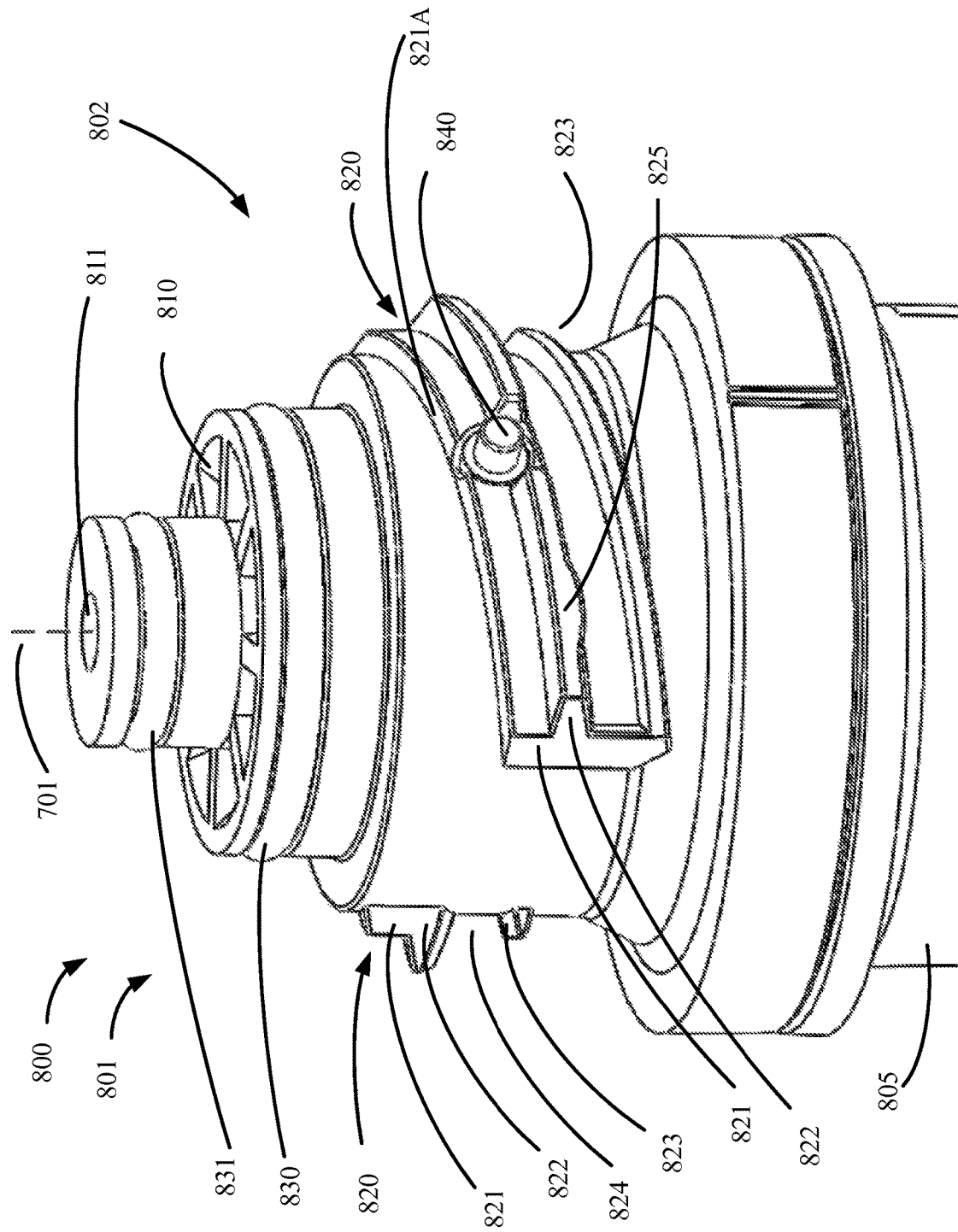
FIGS. 8A-8C schematically illustrate an alternate embodiment of a replaceable cartridge.
Figure 8B:
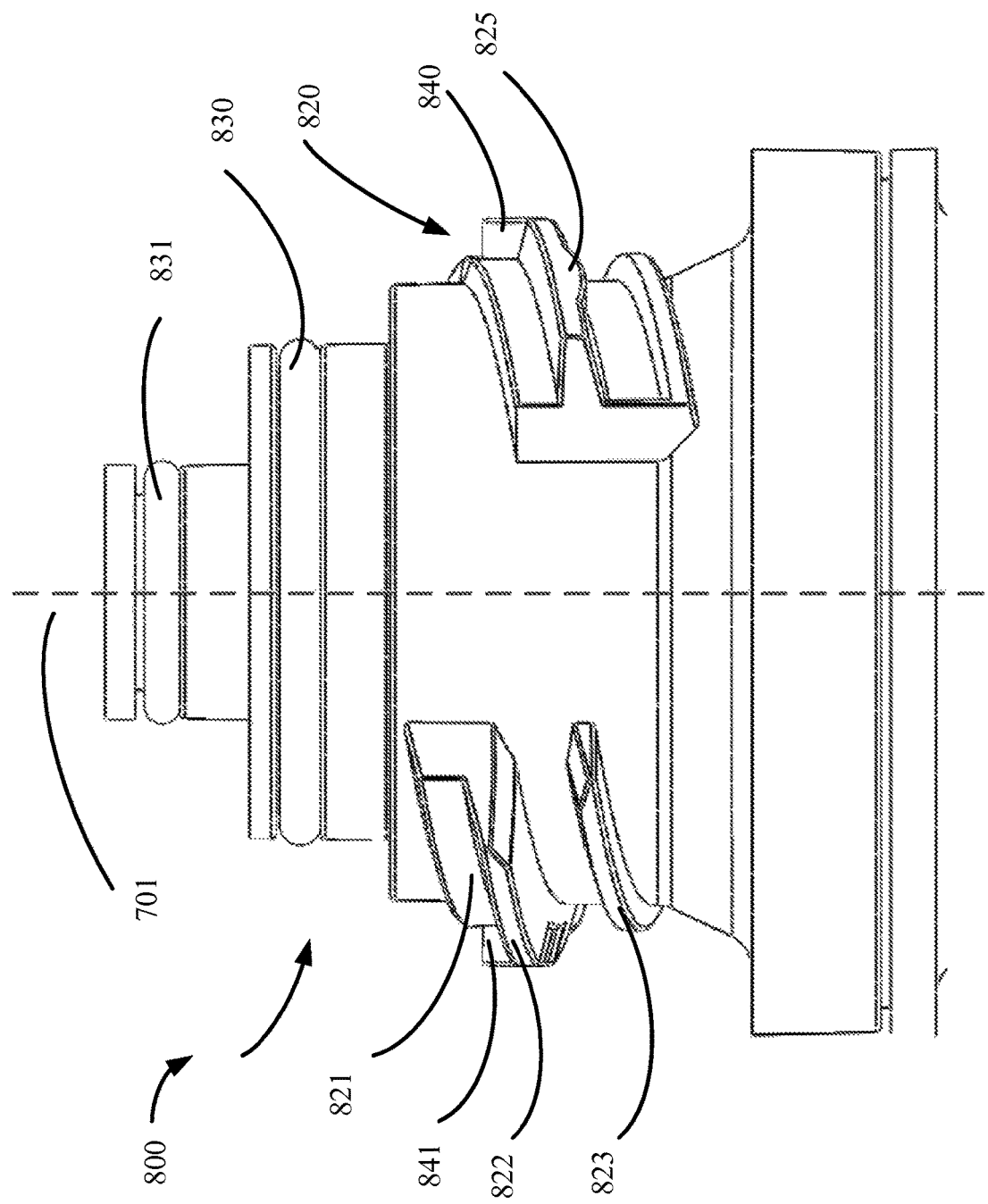
Figure 8C:
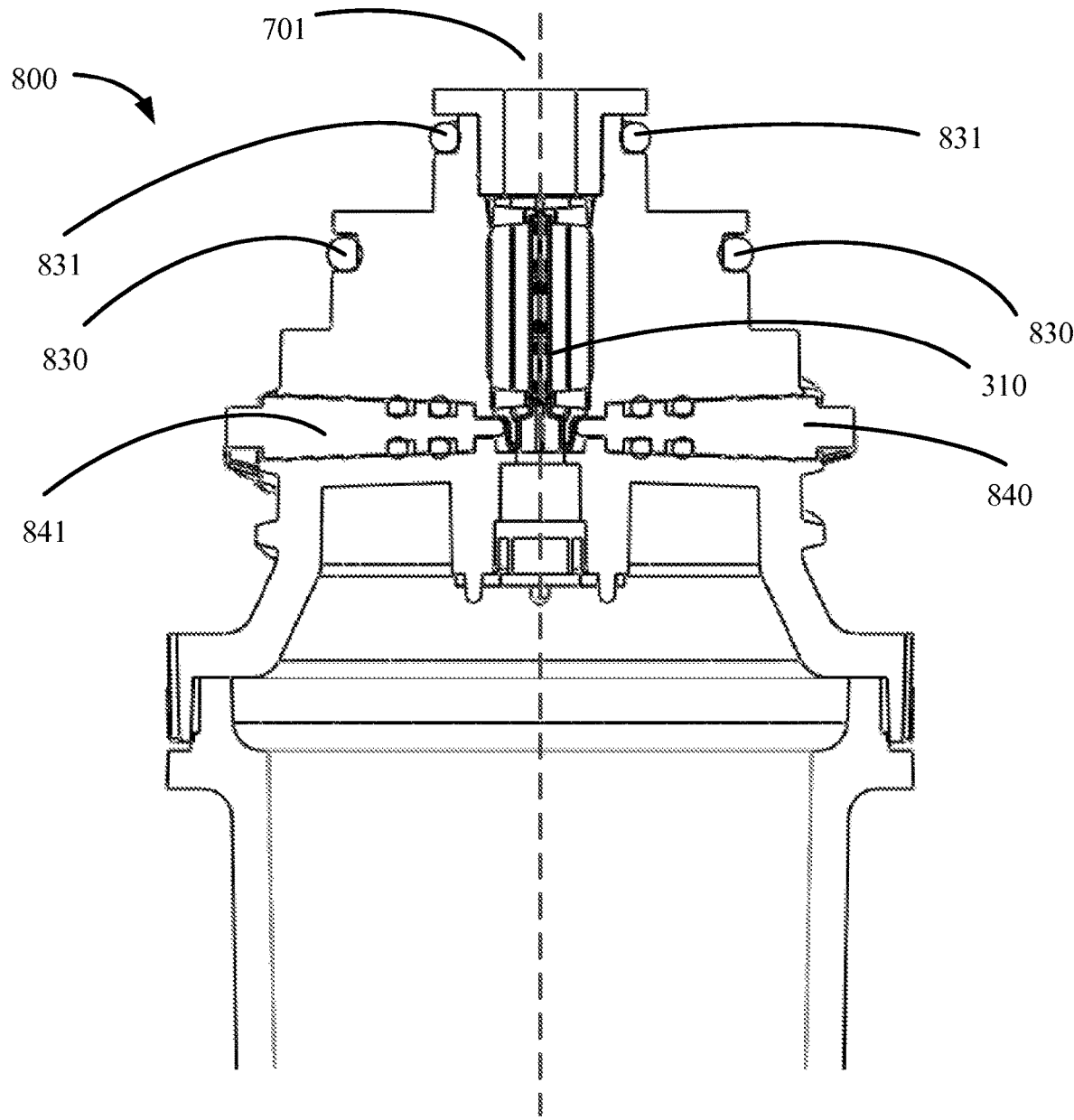

In the embodiment of FIGS. 8A-8C, the cartridge input port 810 and cartridge output port 811 are coaxial about an axis 701 of the cartridge 800, although that is not a limitation of all embodiments. For example, cartridge inputs 810 and outputs 811 may be adjacent to one another on an end of the cartridge 800. Further, although the cartridge output port 811 is surrounded by the cartridge input port 810 in FIGS. 8A-8C, that also is not a limitation of all embodiments. For example, the hub and cartridge could be configured so that the cartridge input is at the center, and is surrounded by the cartridge output port. Also, as schematically illustrated in FIGS. 8A-8C, one of the cartridge ports (in this embodiment the cartridge output port 811), extends further from the tank 805 of the cartridge 800 than the other port (in this embodiment, the cartridge input port 810). In other embodiments, however, the cartridge input port 810 may be coplanar with the cartridge output port 811.

Cartridge 800 also includes two sealing members 830 and 831. Sealing members 830 and 831 may, for example, be O-rings. Sealing member 831 creates a seal between the cartridge 800 and the hub 900 to prevent ozonated water from the cartridge output port from escaping from the cartridge output port. In this way, the ozonated water is prevented from escaping, and is guided from the cartridge 800 to the hub 900. From a fluid's point of view, sealing member 831 is between the cartridge output port 811 and the cartridge input port 810. The second sealing member 830 also forms a seal with the hub 900, and prevents incoming water from leaking out between the cartridge 800 and hub 900 to the external environment i.e., the outside of the hub 900 and cartridge 800). As such, two and only two sealing members 830, 831 effectively seal the assembly of the hub 900 and cartridge 800. In other words, an output channel 851 is formed by and between first sealing member 831 and the hub 900, and an input channel 850 is formed by and between first sealing member 831 and second sealing member 832 and the hub 900.

Supplying power to a removable cartridge, and more particularly to the anode and cathode of an electrolytic cell 310 in a removable cartridge 800, presents certain challenges not present in other devices, such as simple filters, for example. For one, the power must be supplied by a mechanism or means that can be connected as a cartridge 800 is installed on or into a hub 900, and disconnected as the cartridge 800 is removed from the hub 900. If terminals are used for such purpose, the terminals must be kept dry (e.g., not allowed to contact water flowing from the hub 900), and preferably are protected from being damaged while being inserted into the hub 900. To that end, in some embodiments, the cartridge 800 also includes two terminals, 840, 841 on neck 802, to supply power to the electrolytic cell 310. Other embodiments may omit such terminals, for example if power is supplied to the electrolytic cell from a power source internal to the cartridge 800 (e.g., batteries), or through a power interface or plug coupled through the tank 805 for example. Same embodiments may include only one such terminal (e.g., 840 or 841), for example if a ground connection is supplied via the body of the cartridge itself.

In the embodiment of FIGS. 8A-8C, the terminals 840, 841 may be described as radial terminals in that they project from the neck 802 in a radial direction. In some embodiments, terminals 840 and 841 are configured so as to be 180 degrees apart on the neck 802. In FIG. 8C, the terminals 840, 841 extend to the center of the neck 802, although that is not a limitation of all embodiments. In alternate embodiments, one or more terminals 840, 841 may extend into the neck 802 but not all the way to center, and then connect to other conductive elements and then to the electrolytic cell 310. In alternate embodiments, the terminals 840, 841 may simply be conductive pads on the surface of the neck 802, such as on a thread, for example. Terminals 840 and 841 may be coupled to the electrodes (e.g., anode and cathode) of electrolytic cell 310.

In some embodiments, the threads 820 on the neck 802 of cartridge 800 have a multi-tiered profile, as schematically illustrated in FIGS. 8A and 8B, for example. As measured from the axis 701 of the cartridge 800, the two tiers 821, 822 have different radii or radial dimensions as measured from axis 701 for example. An outer tier 822 has a first radial dimension, and operates essentially like a standard thread, to engage counterpart threads or flanges 902 within the bell 901 of the hub 900. An inner tier 821 has a second radial dimension, which second radial dimension is less than the first radial dimension. The tiers 821, 822 may be described as two threads immediately adjacent to one another.

As such, the second tier 821 does not engage counterpart threads or flanges 902 within the bell 901 of the hub 900 in a screwing fashion. However, the second tier may engage threads or flanges 902 directly as the cartridge 800 is inserted into the bell 901 of hub 900 along (i.e., in the direction of) the cartridge axis 701, for example prior to turning or screwing the cartridge 800 into the bell 901. In this way, the inner second tier 821 protects the outer tier 822 from damage that might otherwise occur from contact with the threads or flanges 902, or other object. For example, surface 821A of inner tier 821 may contact an obstruction before a terminal (840, 841) may contact the obstruction. In addition, in some embodiments the terminals 840, 841 extend radially through the inner tier 821, as schematically illustrated in FIG. 8B for example. In other words, the profiles of the terminals 840, 841 are at least partially aligned with the profile of the inner tier 821. In this way, the inner tier protects the terminals 840, 841 from damage that might otherwise occur from contact with the threads or flanges 902, or other objects for example.

In some embodiments, thread 820 includes an additional tier 823, spaced from outer tier 822 in a direction parallel to axis 701. In such embodiments, the additional tier 823 also engages the thread 902 in the bell 901 of hub 900, but tier 823 engages thread 902 on a side opposite the side of thread 902 engaged by outer tier 822. In other words, outer tier 822 and additional tier 823 define a groove 824 into and along which thread 902 slides as cartridge 800 is turned into hub 900. In this way, thread 902 on the hub 900 is sandwiched between outer tier 822 and additional tier 823, to provide additional structural integrity and help guide the thread 902 as it engages thread 822, for example. The tiers 822 and 823 may be described as two threads adjacent to, but spaced from, one another to create groove 824. Various embodiments of the thread 820 may also increase the strength of the thread. For example, in some embodiments, the thread 820 may secure the cartridge 800 to the hub 900 even if the pressure of water within the cartridge reaches several hundred pounds, such as 200 pounds, 300 pounds, 400 pounds, or even 500 pounds per square inch, for example.

In some embodiments, one or more tiers of the cartridge thread 820 (e.g., outer tier 822) includes small bump 825, and a corresponding thread 902 in the hub 900 includes a notch, or detent, 905. As the cartridge 800 advances into the hub 900, the threads 820, 902 rotate with respect to one another such that the bump 825 engages the notch 905. At that point, the force of the bump 825 engaging the notch 905 causes a slight physical impulse, and/or an audible pop, to signal the user that the cartridge 800 is in place and has properly engaged the hub 900.

Figure 9:
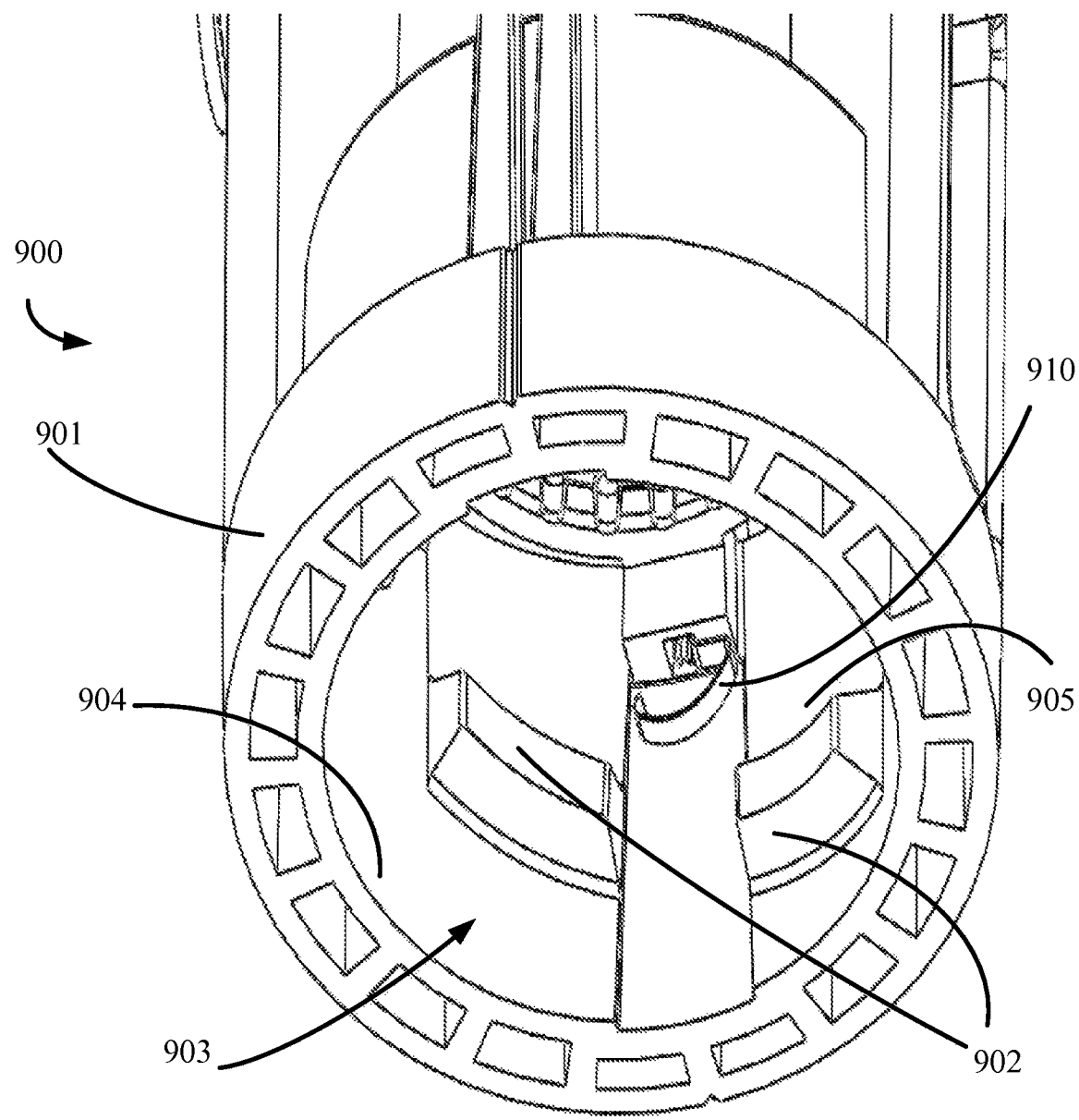
FIG. 9 schematically illustrates an alternate embodiment of a hub.

An embodiment of hub 900 is schematically illustrated in FIG. 9, and includes a bell 901. Bell 901 defines a volume 903 into which one end of cartridge 800 fits. Threads or flanges 902 reside on sidewall 904 of the bell 901, and engage the threads 820 of a cartridge 800, for example as described above.

Hub 900 also includes one or more hub terminals 910. Generally, the hub 900 includes one hub terminal 910 for each terminal 840, 841 on corresponding cartridge 800. As the cartridge 800 screws into the hub 900, the cartridge terminals 840, 841 will eventually advance towards the hub terminals, and will eventually contact hub terminals 910. In this embodiment, hub terminals 910 are cantilevered from the hub 900, and have a spring quality that allows them to flex to engage a cartridge terminal (e.g., 840, 841), while maintaining pressure against, and contact with, the cartridge terminal (e.g., 840, 841). Indeed, in some embodiments, the relative motion of a hub terminal 910 and a cartridge terminal (e.g., 840, 841) causes the hub terminal 910 and cartridge terminal (e.g., 840, 841) to rub against one another, producing an action by which the cartridge terminal (e.g., 840, 841) may clean the hub terminal 910.

In some embodiments, the hub threads 902 and the hub terminals 910 are arranged within the hub 900 such that, as the cartridge 800 advances into the hub 900, the sealing elements (830, 831) on the cartridge 800 engages the hub and form seals, as described above, before the hub terminals 910 contact the cartridge terminals (e.g., 840, 841). In this way, the cartridge 800 is sealed to the hub 900 before power is supplied to the electrolytic cell 310. In some embodiments, water is prevented from flowing from the hub 900 towards the cartridge 800 before such seals are in place.

As mentioned above, some embodiments drive the electrolytic cell 310 with a current source 1131 (a power source from which output current is controlled), which supplies a desired current to the anode of the electrolytic cell 310. As such, the current is controlled, and the voltage varies as required to maintain the desired current flow, and thus the desired ozone production.

Figure 10A:
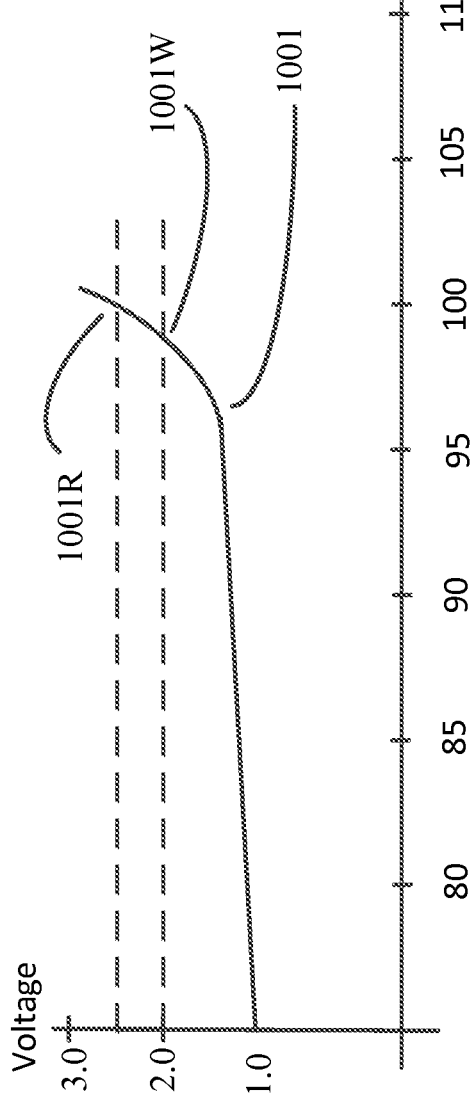
FIGS. 10A and 10B schematically illustrate certain operational characteristics of an electrolytic cell.
Figure 10B:
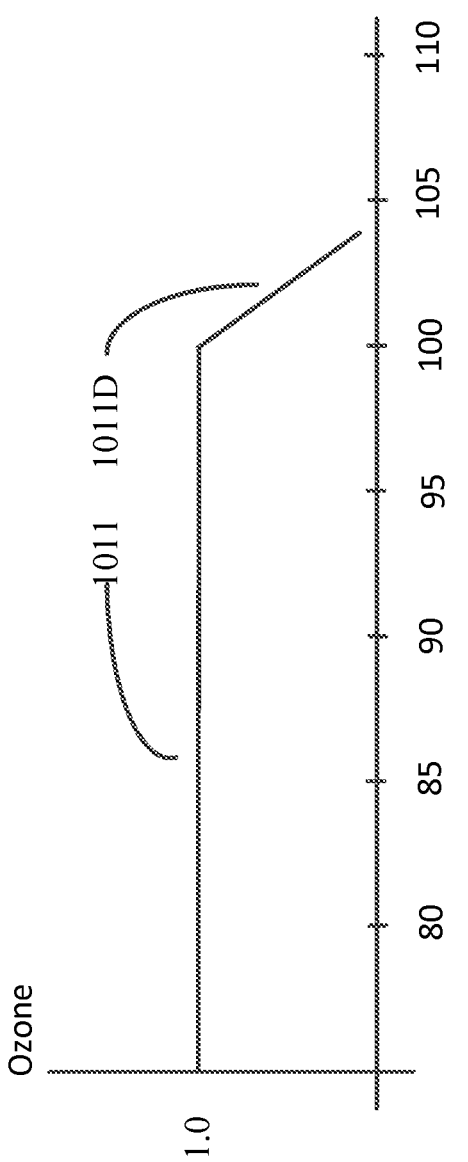

The operating characteristics of such a cell are schematically illustrated by FIGS. 10A and 10B. In a new electrolytic cell driven by a constant current source 1131, the voltage supplied to the cell 310 by the current source 1131 remains substantially constant at a nominal value. The voltage axis in the graph of FIG. 10A expresses the voltage supplied by the current source as a ratio of that voltage to the nominal voltage. The time axes in FIG. 10A and FIG. 10B are expressed as percentages of the "useful life" of an electrolytic cell.

As shown in FIG. 10A, the voltage 1001 required to maintain ozone production 1011 at a fixed drive current rises as the electrolytic cell 310 ages. However, given the constant current drive, the ozone production 1011 remains substantially constant for most of the cell's lifetime, as shown in FIG. 10B.

The inventors have discovered that the rising drive voltage yields information about the operation of the electrolytic cell 310. Indeed, the rising drive voltage signals that the cell is nearing the end of its useful life. For purpose of this application, the end of the useful life of an electrolytic cell 310 is defined as the point at which the cell 310 can no longer produce the desired amount of ozone given the defined drive current and a maximum drive voltage. In some embodiments, the maximum drive voltage may be defined as the maximum voltage that the driving current source can provide, and represents a real limitation in real-world circuits. At the end of its useful life, the ozone production of the cell 310 drops off 1011D, as shown in FIG. 10B. The ozone production of the cell 310 may be described as being within its "normal" range prior to the point at which the ozone production of the cell 310 drops off (1011D).

Thus, the inventors have discovered that the drive voltage may be monitored to assess the health of the electrolytic cell 310. For example, a drive voltage that is twice the nominal drive voltage (1001W) may indicate that the cell 310 has reached 97 percent of its useful life. At this point, the cell 310 continues to produce the desired amount of ozone, but it may be prudent to alert the user that the cell 310 is approaching its end of life.

Similarly, a drive voltage 1001 that is 2.5 times the nominal drive voltage (1001R) may indicate that the cell 310 has reached the end of its useful life. At this point, the cell 310 may be producing some ozone, but its production is less than the desired amount of ozone. As such, it may be prudent to alert the user that the cell 310 has reached its end of life.

The examples illustrated by FIGS. 10A and 10B are merely illustrative. Actual voltages, voltage ratios and ozone production characteristics will depend on the particular cell 310 being used, and the characteristics of the system in which the cell 310 is being used, such as maximum available drive voltage, for example.

Figure 11:
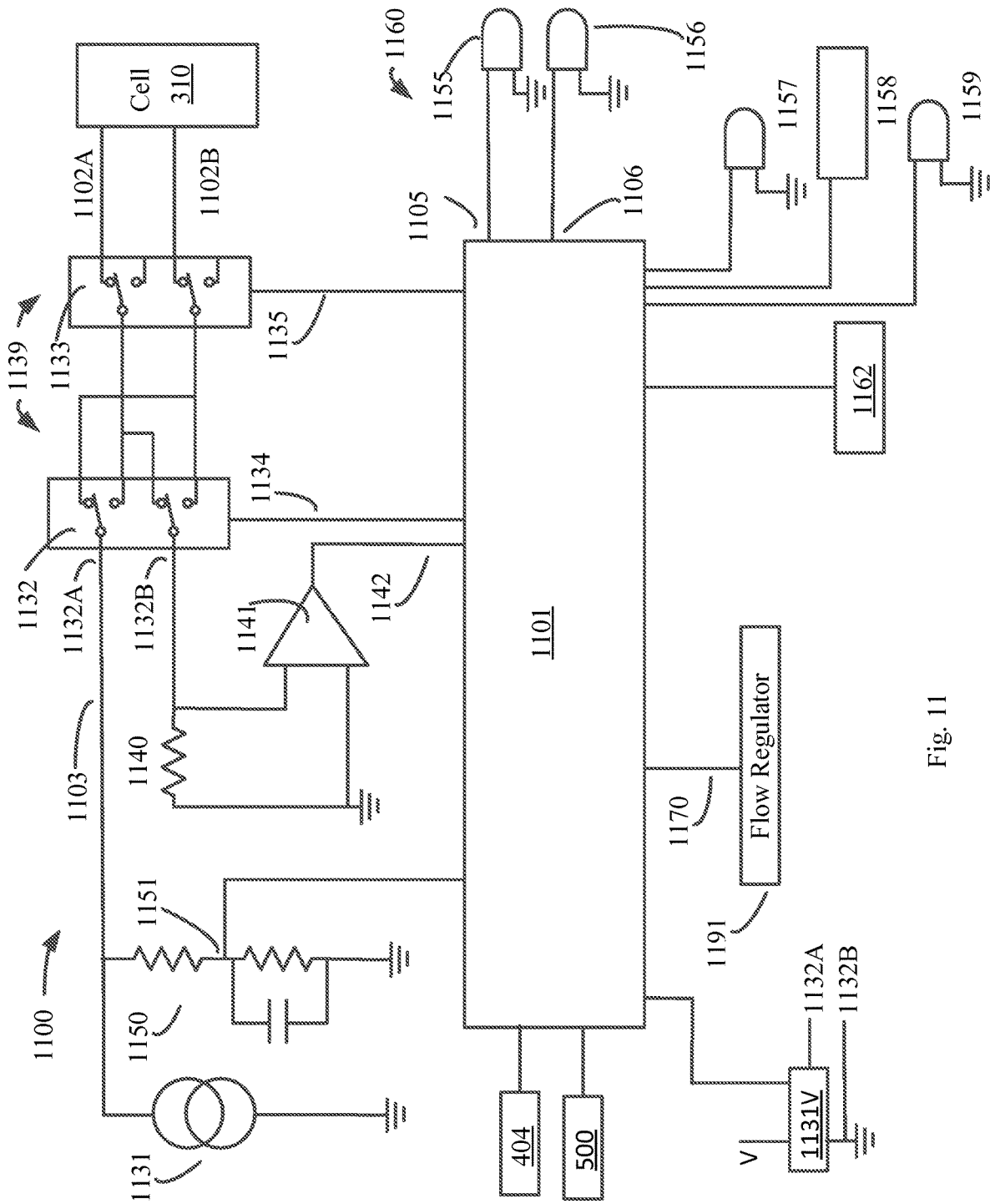
FIG. 11 schematically illustrates circuitry for operating various components of a cartridge system.

An embodiment of a circuit for driving and monitoring an electrolytic cell is schematically illustrated in FIG. 11. The heart of this embodiment is a microcontroller 1101, such as the PIC16F1829, available from Microchip Technology Inc., for example, although other microcontrollers or circuits could also be used. Microcontroller 1101 has a programmable CPU, and includes, among other things, digital memory, comparators, an analog-to-digital (A/D) converter, communications interfaces (such as an I2C bus interface or RS232 interface, for example), and various input and output terminals.

In operation, a current source 1131 outputs a fixed current to the electrolytic cell 310, through a switching circuit 1139. In this embodiment, switching circuit 1139 includes a set of relay circuits 1132 and 1133. Switching network 1139 is coupled to a power source (e.g. current source 1131 or in other embodiments, voltage source 1131V) at terminals 1139A and 1139B. The two relays in relay circuit 1133 control the application of the current to the cell 310, under the control of microcontroller 1101 via control line 1135. In the configuration illustrated in FIG. 11, current from current source 1131 is coupled to cell terminal 1102B, while cell terminal 1102A is coupled to ground. If the relays in relay circuit 1133 were switched to their other positions, terminals 1102A and 1102B would not be connected to the current source 1131 or to ground. As such, relay circuit 1133 acts to enable or disable electrolytic cell 310. Some embodiments may implement the foregoing switching network 1139 and polarity reversal method using electronic means rather than mechanical relays. For example, some embodiments may use a switching network 1139 including semiconductor switches, such as FETs, insulated gate bipolar transistors (i.e., "IGBT") or other transistors, to name but a few.

Relay circuit 1132 controls the polarity of the application of the current to the cell 310, under the control of microcontroller 1101 via control line 1134. In the configuration illustrated in FIG. 11, current from current source 1131 is coupled to cell terminal 1102B, while cell terminal 1102A is coupled to ground. If the relays in relay circuit 1132 were switched to their other positions, the current from the current source would be coupled to cell terminal 1102A, while cell terminal 1102B would be coupled to ground. In this way, the polarity of the drive power to the cell 310 can be controllably reversed, for reasons described above.

The amplitude of the current is specified as that amount of current that will produce the desired amount of ozone in the electrolytic cell 310. As such, the desired amount of current is a function of specific electrolytic cell and the quantity of ozone production desired.

Because the current input to the cell 310 is fixed, the voltage at the input to the cell 310 is variable, depending on the impedance of the cell for example. The impedance of the cell may change over time due, for example, to scale build-up on the electrodes. In some embodiments, the current source 1131 is a switching power supply that boosts the battery voltage to a voltage necessary to drive the cell 310 at the fixed current.

The cell voltage, and optionally the cell current, is monitored to assess the operation and/or health of the cell. In some embodiments, one or more of the electrical parameters of the power provided to or drawn by an electrolytic cell may be monitored (for example, using the circuits and methods described below in connection with voltage divider 1150 and shunt resistor 1140) to assess whether the cell 310 is producing ozone (for example, whether the current and/or voltage to the cell are within the nominal ranges for example as illustrated in FIGS. 10A and 10B). If so, a monitoring circuit may indicate the operational status of the cell 310 by activating a status indicator (such as light 1159, for example). Alternately, a status indicator could be activated if the operation of the assessment indicates that the cell 310 is not producing ozone, or at least not producing ozone at the intended or desired level.

In some embodiments, the voltage supplied to the cell 310 may be monitored through resistor divider 1150, although other circuits could be used. The voltage at node 1151 is a fraction of and is proportional to the voltage supplied to the cell 310, and can be used by microcontroller 1101 to assess the operation of the cell, as described above. For example, the voltage at node 1151 may be supplied to the A/D converter in microcontroller 1101.

Figure 12:
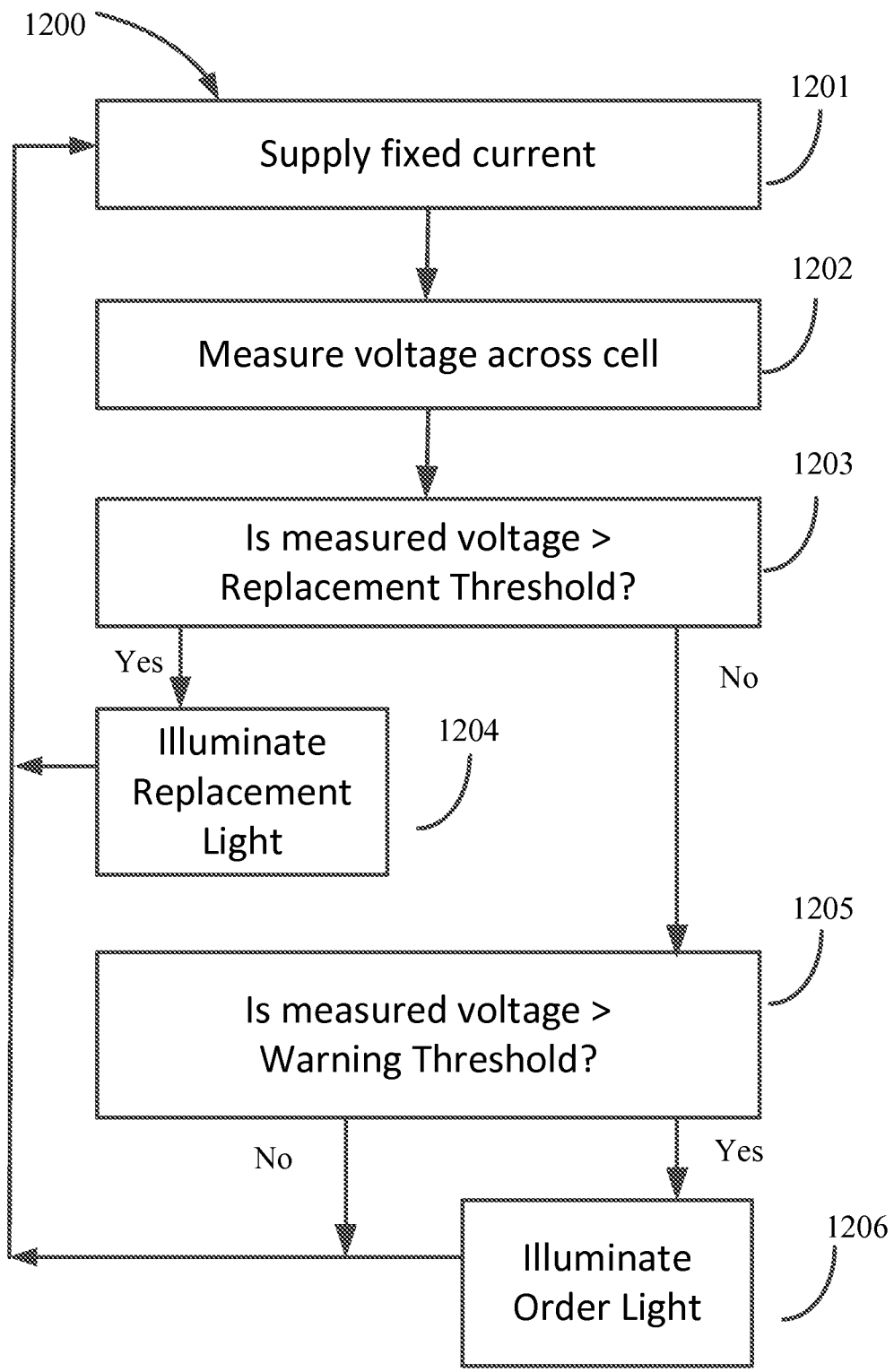
FIG. 12 illustrates a method of monitoring and operating an illustrative electrolytic cell.

In some embodiments, microcontroller 1101 is programmed to assess the measured drive voltage as part of the process 1200 illustrated in FIG. 12. The process 1200 begins by supplying the fixed drive current to the electrolytic cell (step 1201). For example, the programmed microcontroller 1101, under control of software, may operate a switching network 1139 (e.g., close the relays in relay circuits 1132 and 1133) so as to couple the current source 1131 to the cell 310 as shown in FIG. 11.

The process 1200 then measures the voltage across the cell (step 1202), and compares the measured voltage to a first threshold voltage, which may be known as a "Replacement Threshold" (step 1203). The Replacement Threshold is a voltage that indicates that the electrolytic cell should be replaced. For example, this may be the voltage at which the cell has reached the end of its useful life, but in any case should be a voltage not greater than the voltage at which the cell has reached the end of its useful life. If the measured voltage meets or exceeds the Replacement Threshold, the microcontroller 1101 may activate a status indicator and/or deactivate the electrolytic cell 310 (for example, by depriving the cell of power by, e.g., interrupting or cutting-off the flow of current to an input terminal of the cell). For example, the microcontroller 1101 may illuminate a "replacement" light 1155 by outputting an appropriate voltage or current on output terminal 1105 at step 1204. Other forms of status indicator may include audible signals, which may be produced by a beeper or a buzzer 1162, or a tactile signal such as may be produced by a vibrating element, to name but a few.

If the measured voltage is less than the Replacement Threshold, the process 1200 compares the measured voltage to a "Warning Threshold" at step 1205. The Warning Threshold is a voltage that indicates that the electrolytic cell 310 is nearing the end of its useful life, and that the user should consider ordering a replacement cell 310. If the measured voltage meets or exceeds the Warning Threshold, the microcontroller 1101 illuminates an "order" light 1156 by outputting an appropriate voltage or current on output terminal 1106 at step 1206.

Although the drive current is fixed, some embodiments also monitor the drive current, for example, assess the operation (e.g., to catch possible malfunction) of the cell 310, or other components of the drive circuitry. The current may be monitored by measuring the voltage across a shunt resistor 1140; and buffering or amplifying through buffer 1141 before digitizing the voltage the A/D converter in microcontroller 1101, via signal line 1142. The shunt resistor 1140 should have a small resistance, so as not to cause a large voltage drop between the cell 310 and ground. In some embodiments, the shunt resistor 1140 may have a resistance of 0.1 ohms, for example. In this embodiment, the current is measured at the ground terminal of the cell 310 (e.g., through the relay circuits 1132 and 1133), although other embodiments may have the shunt resistor 1140 in the current supply line 1103.

Definitions. As used in this description and the accompanying claims, the following terms shall have the meanings indicated, unless the context otherwise requires:

To "ozonate" water, or a fluid including water, is to decompose at least some of the molecules of water such that the oxygen atoms form ozone, which ozone remains in the water.

The "parameters" of electrical power provided to an electrolytic cell includes the voltage supplied to the cell and the current drawn by the cell. The voltage and current are each a "parameter."

The "operational status" of an electrolytic cell indicates whether (or not) the electrolytic cell is producing ozone.

The "lifetime status" of an electrolytic cell indicates whether the electrolytic cell is nearing, or has reached, the end of its useful life. For example, an electrolytic cell that draws a voltage in excess of a first pre-determined threshold may be deemed to be nearing the end of its useful life, and an electrolytic cell that draws a voltage equal to or in excess of a higher, second pre-determined voltage may be deemed to have reached or surpassed the end of its useful life.

The "useful life" of an electrolytic cell is the time during which the cell can produce ozone while drawing less than a pre-determined amount of power from a power source. In some embodiments, the voltage drawn by the electrolytic cell may be used as a proxy for the power drawn by the cell, and a predetermined voltage may be used as a proxy for the pre-determined power drawn by the cell. The pre-determined power or voltage may be specified by the system designer based on factors such as maximum available power or voltage, or the available heat dissipation properties of the electrolytic cell or a device or system housing the cell, or the ozone-producing capacity of the electrolytic cell, to name but a few. As such, the term "useful life" may not be an absolute term. Rather, it may depend at least in part on the context or system in which an electrolytic cell is used, and/or how the electrolytic cell is used.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A replaceable cartridge for ozonating water, the cartridge including a cartridge housing, an electrolytic cell within the housing; a hub interface configured to removably connect to a hub, the hub interface comprising: a threaded neck; a water inlet fluidly coupled to the electrolytic cell; an ozonated water outlet; a first sealing interface configured to fluidly separate the water inlet from the water outlet when the cartridge is coupled to the hub; a second sealing interface configured to fluidly separate the hub interface from the environment outside of the cartridge.

P2: The replaceable cartridge according to P1, wherein the water inlet and water outlet do not share a common plane.

P3: The replaceable cartridge according to P1, wherein the water inlet is coaxial with the water outlet.

P4. A hub for removably coupling with a plurality of different types of cartridges, the hub being configured to generate ozone and dissolve ozone into source water when coupled with a cartridge of one of the plurality of different types, the hub including a water inlet for receiving the source water; a water outlet for discharging ozonated water; an interface between the water inlet and the water outlet, the interface removably coupling with at least one cartridge port on a cartridge, the interface configured to flow water from the hub into the cartridge, and to flow ozonated water from the cartridge into the hub; and logic for determining whether a cartridge is coupled with the interface, the logic also being configured to determine the type of cartridge coupled with the interface when a cartridge is coupled with the interface.

PS: A hub according to P4, wherein the logic includes a plurality of pins, at least some of the plurality of pins being configured to be engaged by the cartridge when the cartridge is coupled to the hub; and at least one electronic component for monitoring which of the plurality of pins is engaged when the cartridge is coupled to the hub, the at least one electronic component further configured to identify a type of cartridge that is coupled to the hub based upon which of the plurality of pins is engaged.

P6: A hub according to P4, wherein the plurality of different types of cartridges include different sized tanks.

P7: A hub according to P4, wherein the plurality of different types of cartridges include different electrolytic cells.

PS: A hub according to P4, wherein the hub is configured to supply electrical power to the cartridge, and the logic is configured to modulate the electrical power supplied to the cartridge based upon the type of cartridge that is coupled to the hub.

P9. A hub according to PS, wherein the logic modulates at least one of the voltage and current supplied to the cartridge.

P10. A hub according to P4, wherein the logic includes a hall sensor.

P11: A cartridge for removably coupling with a plurality of different types of hubs, each of the hubs having an interface, the cartridge being configured to generate ozone and dissolve ozone into source water when coupled with a hub of one of the plurality of different types, the cartridge including: an electrolytic cell for ozonating the source water, the cell having a cathode, an anode comprising a diamond, and a membrane between the cathode and the anode; at least one cartridge port for removably coupling with the interface on the hub; the at least one cartridge port and the interface configured to flow water from the hub into the electrolytic cell and to flow ozonated water from the electrolytic cell into the hub; and logic for determining whether the cartridge is coupled with the interface, the logic also being configured to determine the type of hub that is coupled with the cartridge port when the cartridge is coupled with the interface.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In alternative embodiments, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

A process that is completely or partially implemented on a computer, microprocessor, or microcontroller (i.e., a "computer process") is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

The embodiments of the invention described above are intended to be merely exemplary; numerous variations and modifications will be apparent to those skilled in the art. For example, but without limitations, features described in connection with one embodiment of a cartridge or a hub may be used with any other cartridges or hub. All such variations and modifications are intended to be within the scope of the present invention as defined in any appended claims.

The invention claimed is:

1. A replaceable cartridge for ozonating water, the cartridge configured to interface with a hub, the cartridge comprising:
    a cartridge housing, an electrolytic cell within the housing, the electrolytic cell having an anode and a cathode;
    a water inlet fluidly coupled to the electrolytic cell; and
    an ozonated water outlet;
    a neck having a central axis and at least one thread configured to rotatingly engage an opposing element on the hub, the neck further comprising at least one radial terminal electrically coupled to one of the anode and the cathode.

2. The replaceable cartridge of claim 1, wherein the at least one radial terminal in the neck comprises two terminals, wherein a first one of the terminals electrically is coupled to the anode, and a second one of the terminals is electrically coupled to the cathode.

3. The replaceable cartridge of claim 2, wherein the terminals are 180 degrees apart on the neck.

4. The replaceable cartridge according to claim 1, wherein the at least one thread has a multi-tiered profile comprising a first ridge having a first radial dimension, and a second ridge having a second radial dimension, the second dimension greater than the first dimension.

5. The replaceable cartridge according to claim 4, wherein the at least one radial terminal extends through the first ridge and is electrically coupled to one of the anode and the cathode.

6. The replaceable cartridge of claim 4, wherein the at least one thread further comprises a third ridge, the third ridge spaced from the second ridge.

7. The replaceable cartridge of claim 1, the cartridge further comprising: at least one sealing element configured to sealingly engage with the hub, and wherein the sealing element, the at least one thread, and the at least one radial terminal are configured such that the at least one sealing element sealingly engages the hub before the at least one radial terminal engages an opposing terminal on the hub.

8. A cartridge for removably coupling with a hub having an interface, the cartridge comprising:
    an electrolytic cell for ozonating source water, the electrolytic cell having a cathode, an anode, and a membrane between the cathode and the anode, the electrolytic cell configured to flow source water through both the cathode and the anode; and
    cartridge ports for removably coupling with the interface on the hub, the cartridge ports comprising an input port configured to flow the source water from the hub into the electrolytic cell, and an output port configured to flow ozonated water from the electrolytic cell into the hub.

9. The cartridge of claim 8, the cartridge further comprising a neck having a central axis, the input port and the output port being arranged coaxial about the central axis and extending through the neck.

10. The cartridge of claim 8, further comprising a filter positioned to filter the source water before the source water enters the electrolytic cell.

11. The cartridge according to claim 8, the cartridge further comprising a neck, and the neck further comprising at least one radial terminal, the at least one radial terminal electrically coupled to one of the anode and the cathode.

12. The cartridge according to claim 11, the neck having at least one thread comprising at least one ridge; the at least one radial terminal extending through the at least one ridge.

13. The cartridge of claim 8, the cartridge further comprising a neck, the neck comprising two terminals, wherein a first one of the terminals electrically coupled to the anode, and a second one of the terminals is electrically coupled to the cathode.

14. The cartridge of claim 8, the anode comprising a boron doped diamond material.

15. The cartridge of claim 14, the anode comprising a substrate coated with the boron doped diamond material.

16. The cartridge of claim 8, the anode comprising a free standing diamond material.

17. The cartridge of claim 16, the free standing diamond material having a thickness of between 0.2 mm to 1.0 mm.

18. An apparatus for generating ozone and dissolving ozone into source water, the apparatus comprising:

a hub including a water inlet for receiving source water, a water outlet for discharging ozonated water, and an interface between the water inlet and the water outlet;

a cartridge including an electrolytic cell for ozonating the source water, the electrolytic cell having a cathode, and a membrane between the cathode and the anode, the electrolytic cell configured to flow source water through both the cathode and the anode, the cartridge further including cartridge ports for removably coupling with the interface on the hub, the cartridge ports and the interface comprising an input port configured to flow source water from the hub into the electrolytic cell, and an output port configured to flow ozonated water from the electrolytic cell into the hub.

19. The apparatus of claim 18, the cartridge comprising a neck having a central axis and at least one thread configured to rotatingly engage an opposing element on the hub.

20. The apparatus of claim 18, the cartridge comprising a neck having a central axis, the input port and the output port being arranged coaxial about the central axis and extending through the neck.

\* \* \* \* \*